(12) United States Patent
Komatsu et al.

(10) Patent No.: US 9,122,105 B2
(45) Date of Patent: Sep. 1, 2015

(54) LIQUID CRYSTAL DISPLAY DEVICE

(71) Applicant: Japan Display Inc., Tokyo (JP)

(72) Inventors: Hiroaki Komatsu, Tokyo (JP); Saori Sugiyama, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 14/056,019

(22) Filed: Oct. 17, 2013

(65) Prior Publication Data

US 2014/0111757 A1  Apr. 24, 2014

(30) Foreign Application Priority Data

Oct. 19, 2012  (JP) ................................. 2012-231438

(51) Int. Cl.
*G02F 1/1339* (2006.01)
*G02F 1/1362* (2006.01)

(52) U.S. Cl.
CPC ...... *G02F 1/13394* (2013.01); *G02F 1/136286* (2013.01); *G02F 2001/13396* (2013.01)

(58) Field of Classification Search
CPC .................. G02F 1/13394; G02F 2001/13396
USPC ................................................ 349/155–157
See application file for complete search history.

(56) References Cited

U.S. PATENT DOCUMENTS

| | | | |
|---|---|---|---|
| 7,423,717 B2 | 9/2008 | Kadotani | |
| 2004/0114087 A1* | 6/2004 | Cho et al. | ...................... 349/155 |
| 2005/0259210 A1* | 11/2005 | Lee et al. | ...................... 349/156 |
| 2012/0127148 A1 | 5/2012 | Lee et al. | |

FOREIGN PATENT DOCUMENTS

| | | |
|---|---|---|
| JP | 2005-338770 | 12/2005 |
| KR | 10-2008-0000791 A | 1/2008 |
| TW | 201232633 A1 | 8/2012 |

OTHER PUBLICATIONS

Office Action dated May 21, 2015 regarding a corresponding Taiwanese Patent Application No. 102132481.

* cited by examiner

*Primary Examiner* — Thanh-Nhan P Nguyen
(74) *Attorney, Agent, or Firm* — Lowe Hauptman & Ham, LLP

(57) ABSTRACT

A liquid crystal display device having 2 pixel multi-domain type pixels, in which columnar spacers are disposed in optimal positions. Each of plural video lines has a first portion in which an acute-angled crossing angle of two crossing angles crossing each of scanning lines becomes a positive angle in a clockwise direction from each of the scanning lines, and a second portion in which an acute-angled crossing angle of the two crossing angles crossing each of scanning lines becomes a negative angle in the clockwise direction from each of the scanning lines. The first and second portions are alternately disposed so as to hold the scanning line between them.

18 Claims, 14 Drawing Sheets

LIQUID CRYSTAL DISPLAY DEVICE

CLAIM OF PRIORITY

The present application claims priority from Japanese patent application JP2012-231438 filed on Oct. 19, 2012, the content of which is hereby incorporated by reference into this application.

BACKGROUND

The present invention relates to a liquid crystal display device and more particularly to the disposition of columnar spacers which hold a constant space between a first substrate and a second substrate which are provided in the liquid crystal display device.

At the present time, many liquid crystal display devices which are generally used are each composed of a pair of substrates (for example, glass substrates) and a liquid crystal composition which is encapsulated in a space defined between the pair of substrates. Specifically, for example, in the case of a liquid crystal display device using an In-Plane-Switching (IPS) system, thin film transistors each having a semiconductor layer made of amorphous silicon or the like, pixel electrodes, signal lines, gate electrodes, a counter electrode, and the like are formed on one substrate (hereinafter referred to as "a TFT substrate"). In addition, a light blocking film, color filters, and the like are formed on the other substrate (hereinafter referred to as "a CF substrate"). Also, the TFT substrate and the CF substrate are disposed so as to face each other with a constant space being held by spacers, and are sealed in peripheries thereof with a sealing agent. Also, a liquid crystal composition is encapsulated in the space between the TFT substrate and the CF substrate, thereby constructing the liquid crystal display device.

As far as the spacer concerned for holding the constant space, instead of using plastic beads whose particle diameters are uniform and which are used in the manner of being uniformly sparged on the substrate, in recent years, columnar spacers which are structured by directly forming a pattern on a non-display area of the CF substrate have been frequently used.

As the columnar spacer, there are known two spacers: a main columnar spacer; and a sub columnar spacer. The main columnar spacer serves to steadily support the gap space defined between the TFT substrate and the CF substrate. Also, the sub columnar spacer serves to support the gap space defined between the TFT substrate and the CF substrate only when a pressure is applied between the TFT substrate and the CF substrate. This technique, for example, is disclosed in JP-2005-338770-A.

SUMMARY

In the liquid crystal display device in which the space defined between the first and second substrates is uniformly held by the columnar spacers, processes for manufacturing the same are as follows. That is to say, after completion of the CF substrate, an alignment film material made of a polyimide liquid solution is applied from a position above the columnar spaces, thereby forming the alignment film.

Also, along a rubbing travelling direction in a phase of rubbing in the alignment process for the alignment film, alignment abnormality from both of the main columnar spacer and the sub columnar spacer is caused to turn into light leakage. This causes reduction of contrast, and streak non-uniformity fault. Here, depending on transmittances of the colors, the light leakage is highest in a green sub pixel, and is lowest in a blue sub pixel.

For this reason, the positions in which to dispose the main columnar spacers and the sub columnar spacers are determined in consideration of the rubbing travelling direction and the disposition of colors.

However, since one bend is formed by two pixels in a 2 pixel multi-domain type pixel, a bending direction differs depending on the pixels. For this reason, the positions in which to dispose the main columnar spacers and the sub columnar spacers need be determined for the arrangement of the sub pixels of Red (R), Green (G), and Blue (B), and the bending direction in a product.

The present invention has been made in order to respond to the desire described above, and it is therefore an object of the present invention to provide optimal positions in which to dispose columnar spacers in a liquid crystal display device having 2 pixel multi-domain type pixels.

The above and other objects, and the novel features of the present invention will be made clear from the following description of this specification, and the accompanying drawings.

The summary of typical contents of the present invention disclosed herein will be described in brief as follows.

In the case of a liquid crystal display panel having 2 pixel multi-domain bending, a columnar spacer is disposed between sub pixels, which results in that dragging in a phase of rubbing is applied to both of the sub pixels. Thus, light leakage is caused in both of the sub pixels. In addition, since the bending directions are different from each other, the dragging in the phase of the rubbing differs depending on the number of stages (odd number stages, or even number stages).

In addition, the higher the height of the columnar spacer, the lower the light leakage level. Thus, the light leakage level is worst in the sub pixel of Green (G) having a high transmittance. It is noted that the transmittance of the sub pixel of Red (R) is high next to the transmittance of the sub pixel of Green (G), and the transmittance of the sub pixel of Blue (B) is lowest.

In the present invention, the disposition of the columnar spacers is changed so that the rubbing dragging to the sub pixel of Green (G) becomes minimum based on the disposition of Red (R), Green (G), and Blue (B), and the number of stages, thereby reducing the light leakage.

In addition, the disposition of the columnar spacers is biased in different directions from the crossing portions between the scanning lines and the video lines by the sub pixels. This results in that the columnar spacers are disposed on one straight line with respect to the rubbing direction irrespective of the bending directions of the sub pixels, thereby minimizing scratches in the phase of the rubbing.

The effects offered from the typical contents of the present invention disclosed in this specification are described in brief as follows.

According to the present invention, in the liquid crystal display device having 2 pixel multi-domain type pixels, the columnar spacers can be disposed in the optimal positions.

These features and advantages of the invention will be apparent from the following more particular description of preferred embodiments of the invention, as illustrated in the accompanying drawings.

DESCRIPTION OF THE PREFERRED EMBODIMENTS

Figure 1:
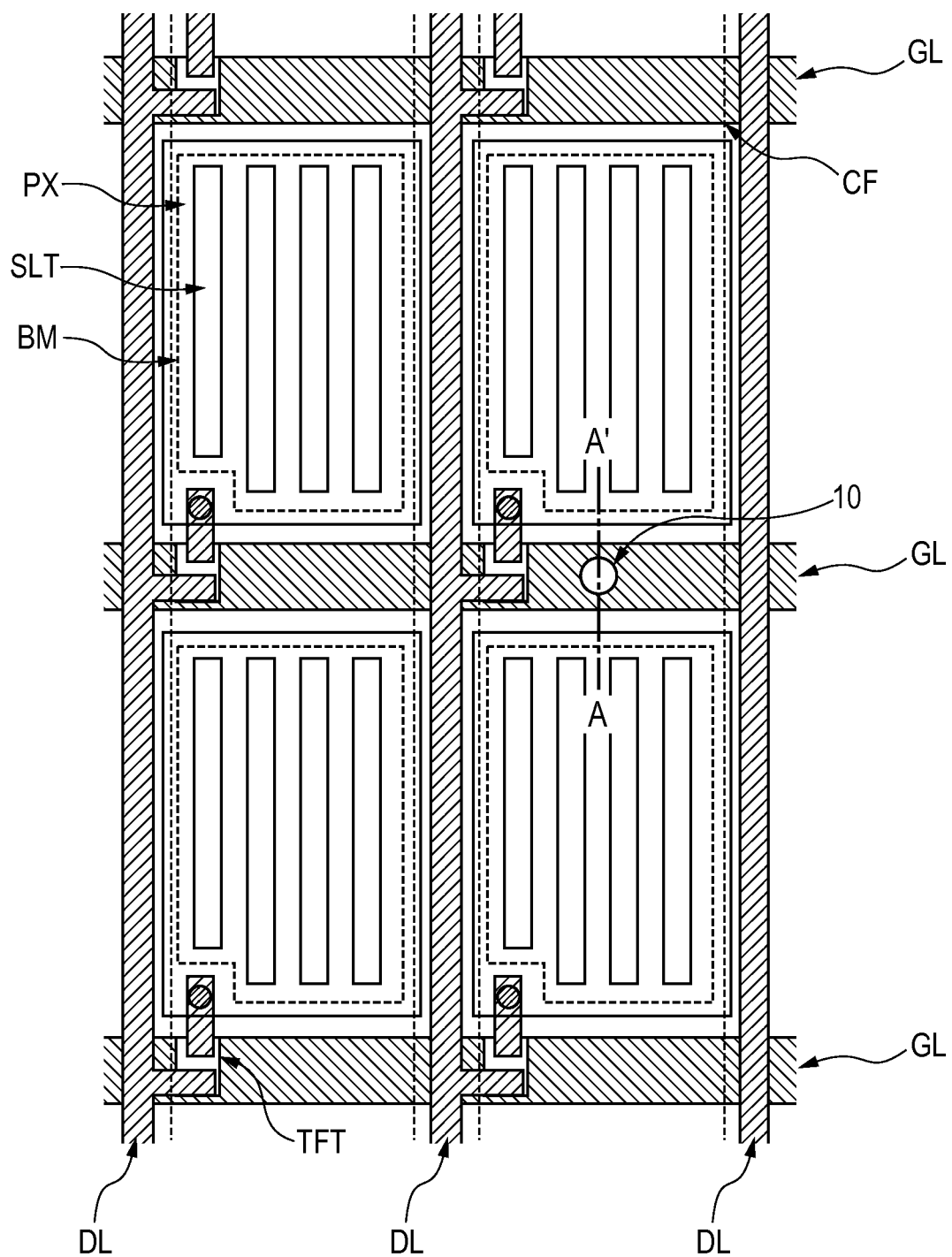
FIG. 1 is a top plan view showing an electrode structure of a conventional liquid crystal display panel.

Hereinafter, embodiments of the present invention will be described in detail with reference to the accompanying drawings.

It is noted that in all of drawings for description of the embodiments, constituent elements having the same functions are designated by the same reference numerals or symbols, respectively, and a repeated description thereof is omitted here for the sake of simplicity. In addition, the following embodiments are not intended to limit the interpretation of the scope of the appended claims of the present invention.

[Structure of Conventional Liquid Crystal Display Panel]

Figure 2:
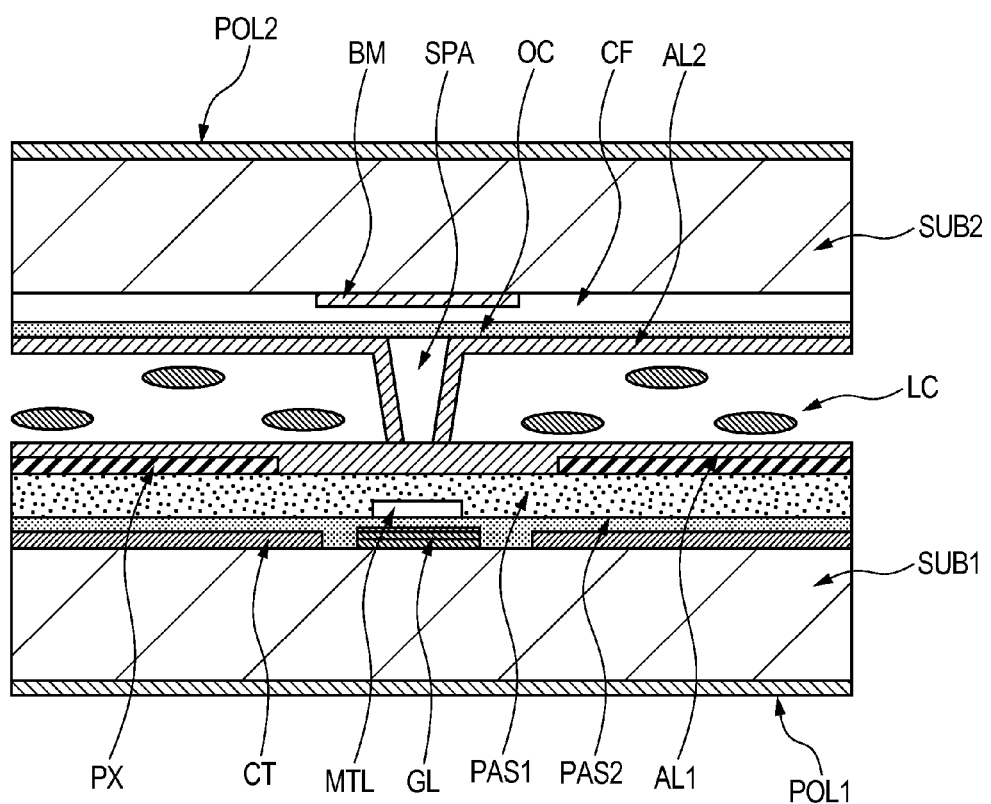
FIG. 2 is a cross-sectional view showing a cross-sectional structure taken on line A-A' of FIG. 1.

FIG. 1 is a top plan view showing an electrode structure of a conventional liquid crystal display panel, and FIG. 2 is a cross-sectional view showing a cross-sectional structure taken on line A-A' of FIG. 1.

The liquid crystal display panel shown in FIG. 1 composes a liquid crystal display device having a liquid crystal display panel using a so-called In-Plane-Switching (IPS) system. In the liquid crystal display panel using the so-called IPS system, an electric field is applied across pixel electrodes formed on one of a pair of glass substrates, and a counter electrode, thereby driving liquid crystal molecules in a liquid crystal layer.

In the conventional liquid crystal display panel shown in FIG. 1, a TFT substrate (a first substrate of the present invention), and a CF substrate (a second substrate of the present invention) are provided so as to sandwich a liquid crystal layer LC between them.

As shown in FIG. 2, the TFT substrate has a transparent substrate (for example, a glass substrate) SUB1. A scanning line (referred to as "a gate line" as well) GL, a counter electrode (referred to as "a common electrode" as well) CT, an interlayer insulating film PAS2, an interlayer insulating film PAS1, pixel electrodes PX, and an alignment film AL1 are formed in order from the transparent substrate SUB1 toward the liquid crystal layer LC on a liquid crystal side of the transparent substrate SUB1. It is noted that a polarizing plate POL1 is formed outside the transparent substrate SUB1.

In addition, although video lines (referred to as either "source lines" or "drain lines" as well) DL, and thin film transistors TFTs are also formed on the liquid crystal layer side of the transparent substrate SUB1, they are omitted in illustration in FIG. 2 for the sake of simplicity.

The CF substrate has a transparent substrate (for example, a glass substrate) SUB2. A light blocking film BM, color filters CF of Red (R), Green (G), and Blue (B), a planarizing film OC, and an alignment film AL2 are formed in order from the transparent substrate SUB2 toward the liquid crystal layer LC on the liquid crystal layer side of the transparent substrate SUB2.

It is noted that a polarizing plate POL2 is formed outside the transparent substrate SUB2. In addition, in the liquid crystal display panel shown in FIG. 1, the principal surface side of the transparent substrate SUB2 is determined as an observation side.

In addition, in the liquid crystal panel shown in FIG. 1, the counter electrode CT is formed in plane, and plural slits SLT are formed in the pixel electrode PX.

In the liquid crystal panel shown in FIG. 1, the pixel electrodes PXs and the counter electrode CT are laminated on top of each other through the interlayer insulating film PAS1. Also, arch-like electric lines of force which are formed between the pixel electrodes PXs and the counter electrode CT are distributed so as to penetrate through the liquid crystal layer LC, thereby changing the alignment of the liquid crystal layer LC.

Each of the pixel electrode PX and the counter electrode CT, for example, is composed of a transparent conductive film made of an Indium Tin Oxide (ITO). In addition, the pixel electrodes PXs and the counter electrode CT are superposed on each other through the interlayer insulating films PAS1, PAS2, thereby forming a holding capacitor. It is noted that the interlayer insulating film PAS1 is by no means limited to one layer, and thus two or more layers may be provided as the interlayer insulating film PAS1.

As shown in FIG. 1, one sub pixel is formed in a rectangular area surrounded by the scanning lines GL and the video lines DL. The area in which the one sub pixel is formed is lightblocked by the light blocking film BM formed on the CF substrate SUB2 side. Thus, the area which functions as the area in which the substantial one sub pixel is formed becomes an opening portion (indicated by a heavy line in FIG. 2) of the light blocking film BM. In addition, in FIG. 1, the TFT is a thin film transistor composing an active device.

A columnar spacer SPA for holding a constant gap defined between a pair of transparent substrate SUB1, SUB2 is formed in a position 10 of FIG. 1 of the transparent substrate SUB2. The columnar spacer SPA, as shown in FIG. 2, is formed so as to be located in a position above the scanning line GL on the transparent substrate SUB1 side.

The columnar spacer SPA is made of a photosensitive resin, and is formed above the light blocking film BM of the transparent substrate SUB2. It is noted that plural columnar spacers SPA which are to be formed above the light blocking film BM are formed in the actual products.

In addition, a mounting layer MTL is formed above the scanning line GL of the transparent substrate SUB1. It is noted that the mounting layer MTL is composed of either a metallic film made of aluminum (Al) or the like, or an amorphous silicon layer.

[Outline of Structure of Electrode of Liquid Crystal Display Panel in Liquid Crystal Display Device of the Present Invention]

Figure 3:
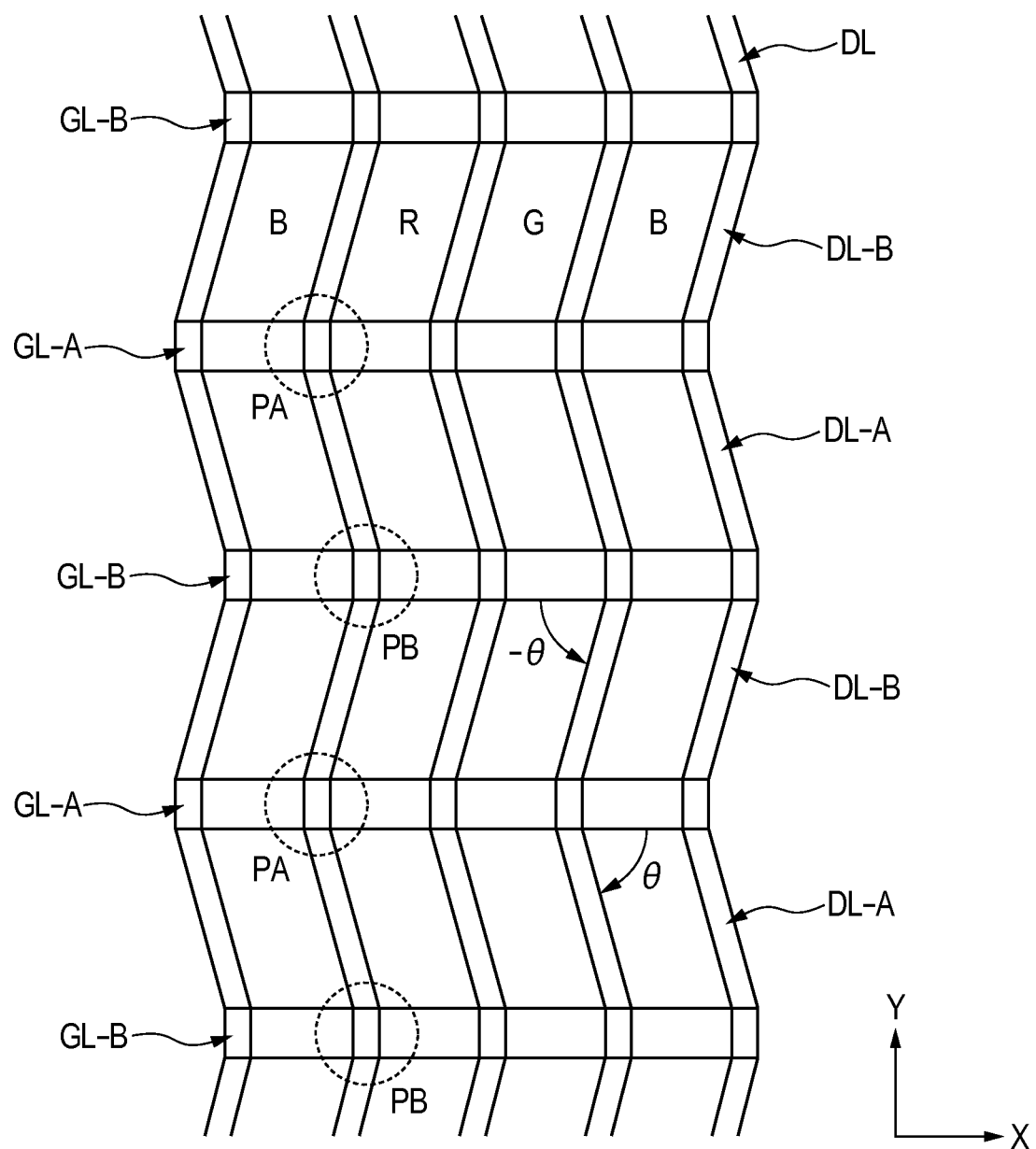
FIG. 3 is a top plan view explaining an outline of an electrode structure of a liquid crystal display panel in a liquid crystal display device of the present invention.

FIG. 3 is a top plan view explaining an outline of an electrode structure of a liquid crystal display panel in a liquid crystal display device of the present invention.

The liquid crystal display panel in the liquid crystal display device of the present invention is a 2 pixel multi-domain type liquid crystal display panel. Therefore, a TFT substrate has plural scanning lines GL and plural lines DL. The plural scanning lines GL are disposed in a second direction (in a Y direction in FIG. 3) so as to extend in a first direction (in an X direction in FIG. 3) perpendicular to the second direction. The plural video lines DL are disposed in the first direction so as to extend in the second direction while they are bent.

Each of the plural video lines GL has a portion DL-A and a portion DL-B. In the portion DL-A, an acute-angled crossing angle of two crossing angles at which corresponding one of the plural video lines DL crosses corresponding one of the plural scanning lines GL becomes a positive angle (θ in FIG. 3) in a clockwise direction. In the portion DL-B, an acute-angled crossing angle of two crossing angles at which corresponding one of the plural video lines DL crosses corresponding one of the plural scanning lines GL becomes a negative angle (−θ in FIG. 3) in the clockwise direction. The portion DL-A and the portion DL-B are alternatively disposed so as to hold the scanning line GL between them.

In the following description, the scanning line with which the portion DL-A and the portion DL-B of each of the video lines DL cross adjacent scanning line GL-B in a position (a position PA in FIG. 3) on the side of the sub pixel of B (the sub pixel of a third color) with respect to a crossing position (a position PB in FIG. 3) where the portion DL-A and the position DL-B of each of the video lines DL cross each other is defined as a scanning line A(GL-A). In addition, a scanning line with which the portion DL-A and the portion DL-B of each of the video lines DL cross the adjacent scanning line GL-A in a position (the position PB in FIG. 3) on the side of the sub pixel of R (the sub pixel of a first color) with respect to a crossing position (the position PA in FIG. 3) where the portion DL-A and the position DL-B of each of the video lines DL cross each other is defined as a scanning line B(GL-B).

As will be described later, the columnar spacers are disposed in the crossing position PA and the crossing position PB, respectively. That is to say, the columnar spacers are disposed in such a way that an area in which the video line and the scanning line overlap each other, and at least a part of the columnar spacer overlap each other in a planar view. It is noted that although a planar structure (a shape of the video line, a shape of the pixel electrode, and the disposition of the columnar spacers) of the liquid crystal display panel in the liquid crystal display device of the present invention is different from that in FIG. 1, a cross-sectional structure thereof is basically identical to that in FIG. 2. However, as will be described later, the columnar spacer includes a main columnar spacer and a sub columnar spacer. A height of the main columnar spacer is higher than that of the sub columnar spacer. In addition, the main columnar spacer and the sub columnar spacer are disposed in portions having a substantially identical stepped portion. Therefore, although a top portion of the main columnar spacer usually comes in contact with the TFT substrate, a top portion of the sub columnar spacer does not come in contact with the TFT substrate.

The main columnar spacer and the sub columnar spacer different from the main columnar spacer have been described. However, it is not limited that the sub columnar spacer is lower in height than the main columnar spacer, and thus the sub columnar spacer may also have a small planar area. In addition, the sub columnar spacer and the main columnar spacer may have the same shape. In this case, although there is no distinction between the main columnar spacer and the sub columnar spacer, even so, the light leakage can be reduced by the structure of the present invention.

Although the main columnar spacer and the sub columnar spacer are both formed on the CF substrate, they may also be formed on the TFT substrate side. In addition, the color filters may be formed on the TFT substrate side. In this case, the CF substrate will be referred to as a counter substrate facing the TFT substrate. It is noted that a rubbing direction is the second direction.

[Disposition of Columnar Spacers of Liquid Crystal Display Panel in First Embodiment of the Present Invention]

Figure 4:
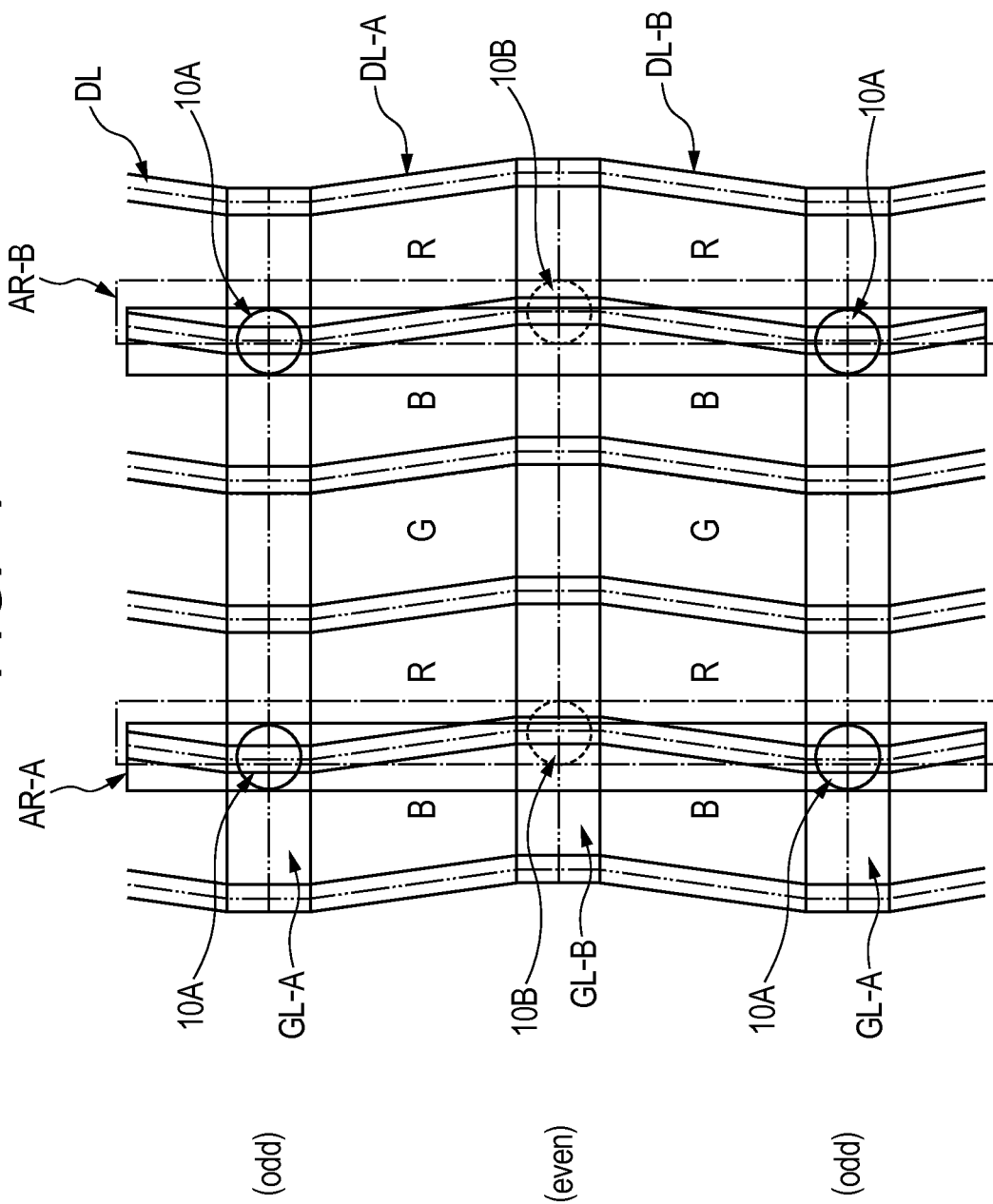
FIG. 4 is a top plan view explaining the disposition of columnar spacers of a liquid crystal display panel in a liquid crystal display device according to a first embodiment of the present invention.

FIG. 4 is a top plan view explaining the disposition of columnar spacers of a liquid crystal display panel in a liquid crystal display device according to a first embodiment of the present invention. It is noted that FIG. 4 and figures which will be described later are each a top plan view showing a correspondence relationship among the columnar spacers, the video lines, and the scanning lines.

In FIG. 4 and the figures which will be described later, reference symbols R, G, and B designate the sub pixels of Red, Green, and Blue, respectively, reference symbol 10A designates the position in which to dispose of the main columnar spacer, and reference symbol 10B designates the position in which to dispose the sub columnar spacer. Also, reference symbol AR-A designates a scratch in a phase of rubbing by the main columnar spacer 10A, and reference symbol AR-B designates a scratch in a phase of rubbing by the sub columnar spacer 10B.

It is noted that in FIG. 4 and the figures which will be described later, the scanning line A(GL-A) is the odd-numbered (odd) scanning line, the scanning line B(GL-B) is the even-numbered (even) scanning line, and the travelling direction of the rubbing is the Y direction in FIG. 3.

In the disposition shown in FIG. 4, the main columnar spacer 10A is disposed in the crossing point between the scanning line A(GL-A), and the video line DL provided between the sub pixel of Blue (B) and the sub pixel of Red (R). Also, the sub columnar spacer 10B is disposed in the crossing point between the scanning line B(GL-B), and the video line DL provided between the sub pixel of Blue (B) and the sub pixel of Red (R). Here, the crossing point between the scanning line and the video line means a cross point between a center line of the scanning line, and a center line of the video line in the planar view.

With the disposition shown in FIG. 4, none of the scratches AR-A, AR-B in the phase of the rubbing by the main columnar spacer 10A and the sub columnar spacer 10B is caused in the sub pixel of Green (G).

In addition, the scratches AR-A, AR-B in the phase of the rubbing by both of the main columnar spacer 10A having the high height, and the sub columnar spacer 10B having the low height are caused in the sub pixel of Red (R). However, it is possible to reduce the scratch AR-B in the phase of the rubbing by the sub columnar spacer 10B having the low height.

In addition, the scratches AR-A, AR-B in the phase of the rubbing by both of the main columnar spacer 10A having the high height, and the sub columnar spacer 10B having the low height are caused in the sub pixel of Blue (B). However, it is possible to reduce the scratch AR-B in the phase of the rubbing by the sub columnar spacer 10B having the low height.

[Disposition of Columnar Spacers of Liquid Crystal Display Panel in Second Embodiment of the Present Invention]

Figure 5:
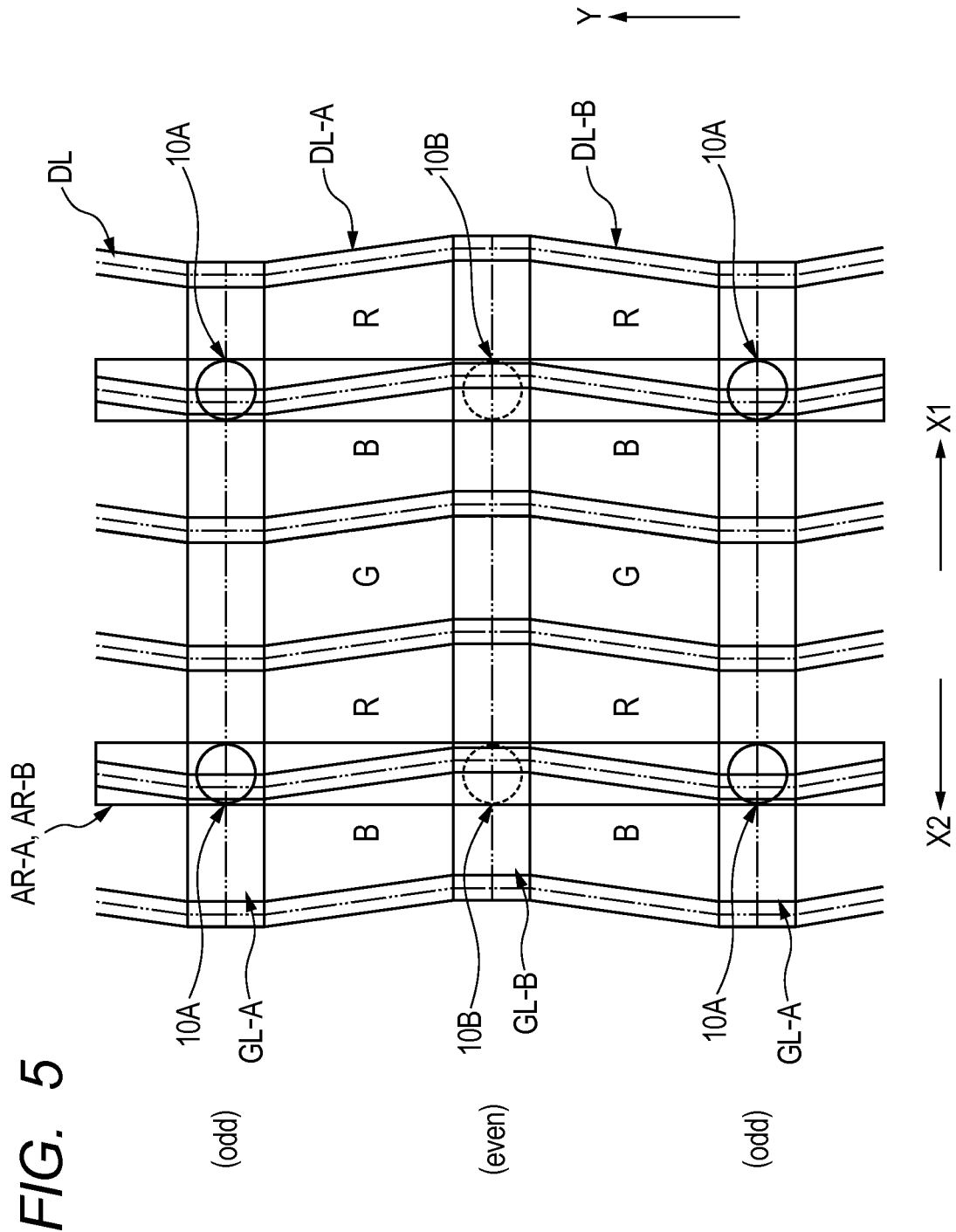
FIG. 5 is a top plan view explaining the disposition of columnar spacers of a liquid crystal display panel in a liquid crystal display device according to a second embodiment of the present invention.

FIG. 5 is a top plan view explaining the disposition of columnar spacers of a liquid crystal display panel in a liquid crystal display device according to a second embodiment of the present invention.

The disposition shown in FIG. 5 is such that in the disposition shown in FIG. 4, the main columnar spacers 10A are displaced in a direction indicated by X1 shown in FIG. 5, the sub columnar spacers 10B are displaced in a direction indicated by X2 shown in FIG. 5, and the centers of the main columnar spacers 10A disposed in the Y direction of FIG. 5, and the centers of the sub columnar spacers 10B are made to agree with each other. That is to say, the center of the main columnar spacer 10A is disposed so as to be located in a position on the side of the sub pixel of Red (R) (in the direction of X1) with respect to the crossing point between the scanning line A(GL-A) and the video line DL provided between the sub pixel of Blue (B) and the sub pixel of Red (R). Also, the center of the sub columnar spacer 10B is disposed so as to be located in a position on the side of the sub pixel of Blue (B) (in the direction of X2) with respect to the crossing point between the scanning line B(GL-B) and the video line DL provided between the sub pixel of Blue (B) and the sub pixel of Red (R).

With the disposition shown in FIG. 5, none of the scratches AR-A, AR-B in the phase of the rubbing by both of the main columnar spacer 10A and the sub columnar spacer 10B is caused in the sub pixel of Green (G).

In addition, the scratches AR-A, AR-B in the phase of the rubbing by both of the main columnar spacer 10A having the high height, and the sub columnar spacer 10B having the low height are caused in each of the sub pixel of Red (R), and the sub pixel of Blue (B). However, the scratch AR-A and the scratch AR-B overlap each other, thereby making it possible to reduce the area of the scratches.

Note that, in FIG. 5, the center of the main columnar spacer 10A disposed in the Y direction of FIG. 5 is made to agree with the center of the sub columnar spacer 10B. However, the main columnar spacer 10A is displaced in an arbitrary position between a position corresponding to the state of FIG. 4, and a position corresponding to the state of FIG. 5 in the direction of X1 shown in FIG. 5, and the sub columnar spacer 10B is displaced in the direction indicated by X2 shown in FIG. 5. As a result, the scratch AR-A and the scratch AR-B overlap each other, whereby the area of the scratches can be made smaller than that in the case of the disposition shown in FIG. 4. That is to say, the centers of the main columnar spacers 10A disposed in the Y direction of FIG. 5, and the centers of the sub columnar spacers 10B are not necessarily made to agree with each other, and thus they may be slightly shifted from each other as long as an amount of position shift in this case is smaller than that in FIG. 4.

In addition, in FIGS. 4 and 5, the main columnar spacer 10A is disposed in the crossing point (or in the vicinity thereof) between the scanning line A(GL-A) and the video line DL provided between the sub pixel of Blue (B) and the sub pixel of Red (R). Also, the sub columnar spacer 10B is disposed in the crossing point (or in the vicinity thereof) between the scanning line B(GL-B) and the video line DL provided between the sub pixel of Blue (B) and the sub pixel of Red (R). However, alternatively, the main columnar spacer 10A may be disposed in the crossing point (or in the vicinity thereof) between the scanning line B(GL-B) and the video line DL provided between the sub pixel of Blue (B) and the sub pixel of Red (R).

In addition, in FIGS. 4 and 5, the disposition of the sub pixels within one pixel may be changed to the disposition of the sub pixels of Blue (B), Green (G), and Red (R) instead of using the disposition of the sub pixels of Red (R), Green (G), and Blue (B).

[Disposition of Columnar Spacers of Liquid Crystal Panel in Third Embodiment of the Present Invention]

Figure 6:
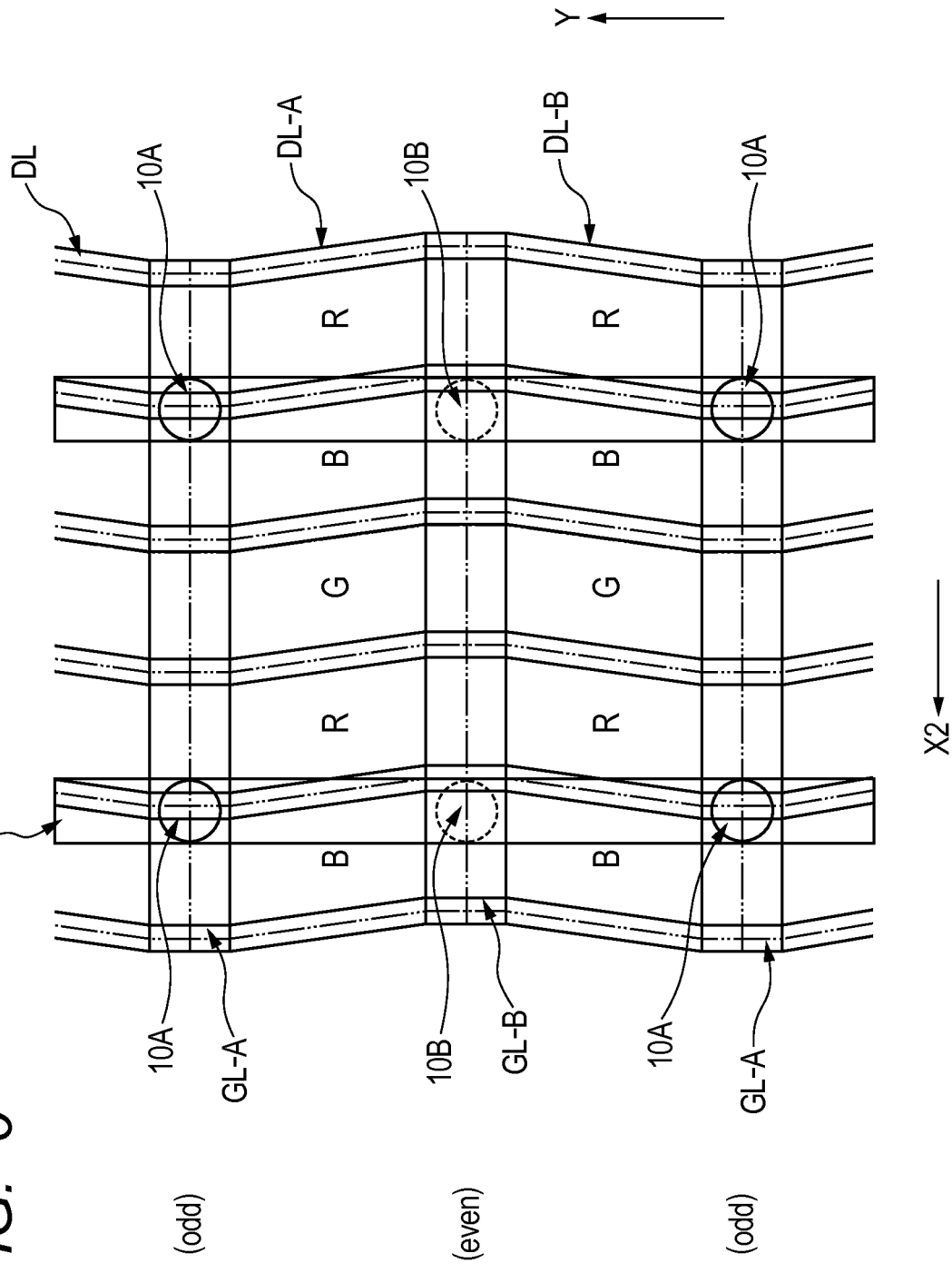
FIG. 6 is a top plan view explaining the disposition of columnar spacers of a liquid crystal display panel in a liquid crystal display device according to a third embodiment of the present invention.

FIG. 6 is a top plan view explaining the disposition of columnar spacers of a liquid crystal display panel in a liquid crystal display device according to a third embodiment of the present invention.

The disposition shown in FIG. 6 is such that in the disposition shown in FIG. 4, the main columnar spacers 10A and the sub columnar spacers 10B are both displaced in the direction of X2 of FIG. 6, and the centers of the main columnar spacers 10A disposed in the Y direction of FIG. 6, and the centers of the sub columnar spacers 10B disposed in the Y direction of FIG. 6 are made to agree with each other. That is to say, the center of the sub columnar spacer 10B is disposed so as to be located in the position on the side of the sub pixel of Blue (B) (in the direction of X2) with respect to the crossing point between the scanning line B(GL-B) and the video line DL provided between the sub pixel of Blue (B) and the sub pixel of Red (R). It is noted that the centers of the main columnar spacers 10A disposed in the Y direction of FIG. 6, and the centers of the sub columnar spacers 10B are not necessarily made to agree with each other, and thus they may be slightly shifted from each other as long as the amount of position shift in this case is smaller than that in FIG. 4.

Figure 7:
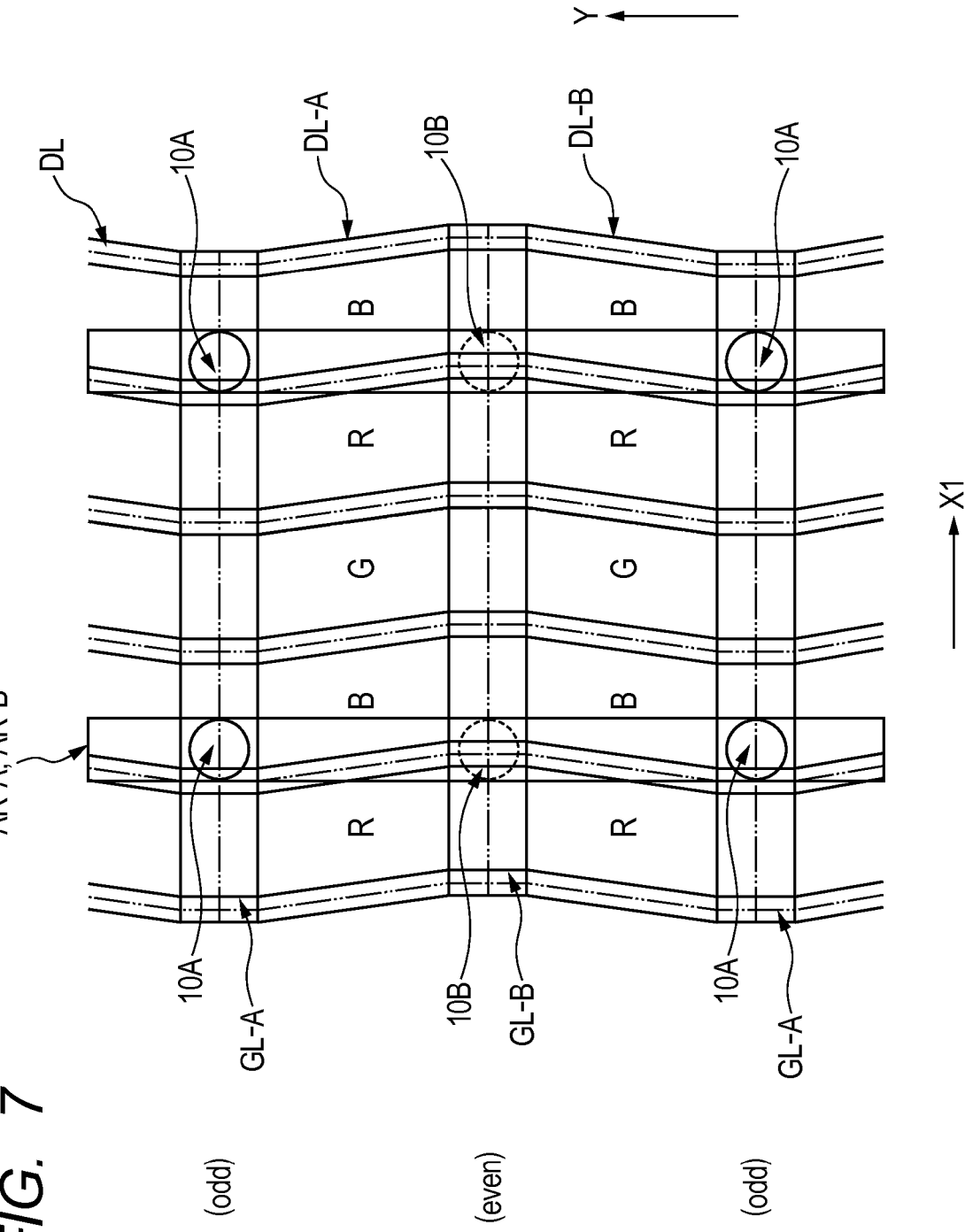
FIG. 7 is a top plan view explaining the disposition of columnar spacers of a liquid crystal display panel in a liquid crystal display device according to a modified change of the third embodiment of the present invention.

FIG. 7 is a top plan view explaining the disposition of columnar spacers of a liquid crystal display panel in a liquid crystal display device according to a modified change of the third embodiment of the present invention.

The disposition shown in FIG. 7 is such that the disposition of the sub pixels within one pixel is changed to the disposition of the sub pixels of Blue (B), Green (G), and Red (R) instead of using the disposition of the sub pixels of Red (R), Green (G), and Blue (B). The case of the disposition shown in FIG. 7 is such that in the disposition shown in FIG. 4, the main columnar spacers 10A and the sub columnar spacers 10B are both displaced in the direction of X1 shown in FIG. 7, and the center of the main columnar spacers 10A and the center of the sub columnar spacers 10B which are both disposed in the Y direction of FIG. 7 are made to agree with each other. That is to say, the center of the main columnar spacer 10A is disposed so as to be located in a position on the side of the sub pixel of Blue (B) (in the direction of X1) with respect to a crossing point between the scanning line A(GL-A) and the video line DL provided between the sub pixel of Red (R) and the sub pixel of Blue (B). It is noted that the centers of the main columnar spacers 10A disposed in the Y direction of FIG. 7, and the centers of the sub columnar spacers 10B are not necessarily made to agree with each other, and thus they may be slightly shifted from each other as long as the amount of position shift in this case is smaller than that in FIG. 4.

With the disposition shown in FIG. 6 or 7, respectively, none of the scratches AR-A, AR-B in the phase of the rubbing by both of the main columnar spacer 10A and the sub columnar spacer 10B is caused in the sub pixel of Green (G).

In addition, the scratches AR-A, AR-B in the phase of the rubbing by both of the main columnar spacer 10A having the high height, and the sub columnar spacer 10B having the low height are caused in each of the sub pixel of Red (R), and the sub pixel of Blue (B). However, it is possible to reduce the amount of scratches AR-A, AR-B in the phase of the rubbing by both of the main columnar spacer 10A, and the sub columnar spacer 10B which are caused in the sub pixel of Red (R).

In addition thereto, with the disposition shown in FIG. 6 or 7, respectively, similarly to the case of the disposition shown in FIG. 5, the scratch AR-A and the scratch AR-B overlap each other, thereby making it possible to reduce the area of the scratches.

It is noted that the displacement amounts of main columnar spacer 10A and the sub columnar spacer 10B are each increased, whereby it is possible to remove the scratches AR-A, AR-B, in the phase of the rubbing by both of the main columnar spacer 10A and the sub columnar spacer 10B which are caused in the sub pixel of Red (R). However, if the displacement amount is increased, then, the top of the main columnar spacer 10A or the sub columnar spacer 10B does not come in contact with the stepped portion (the stepped portion caused by the crossing between the scanning line GL and the video line DL). For this reason, the displacement amount is preferably set in such a way that the top of the main columnar spacer 10A or the sub columnar spacer 10B comes in contact with a part of the stepped portion.

[Disposition of Columnar Spaces of Liquid Crystal Display Panel in Fourth Embodiment of the Present Invention]

Figure 8:
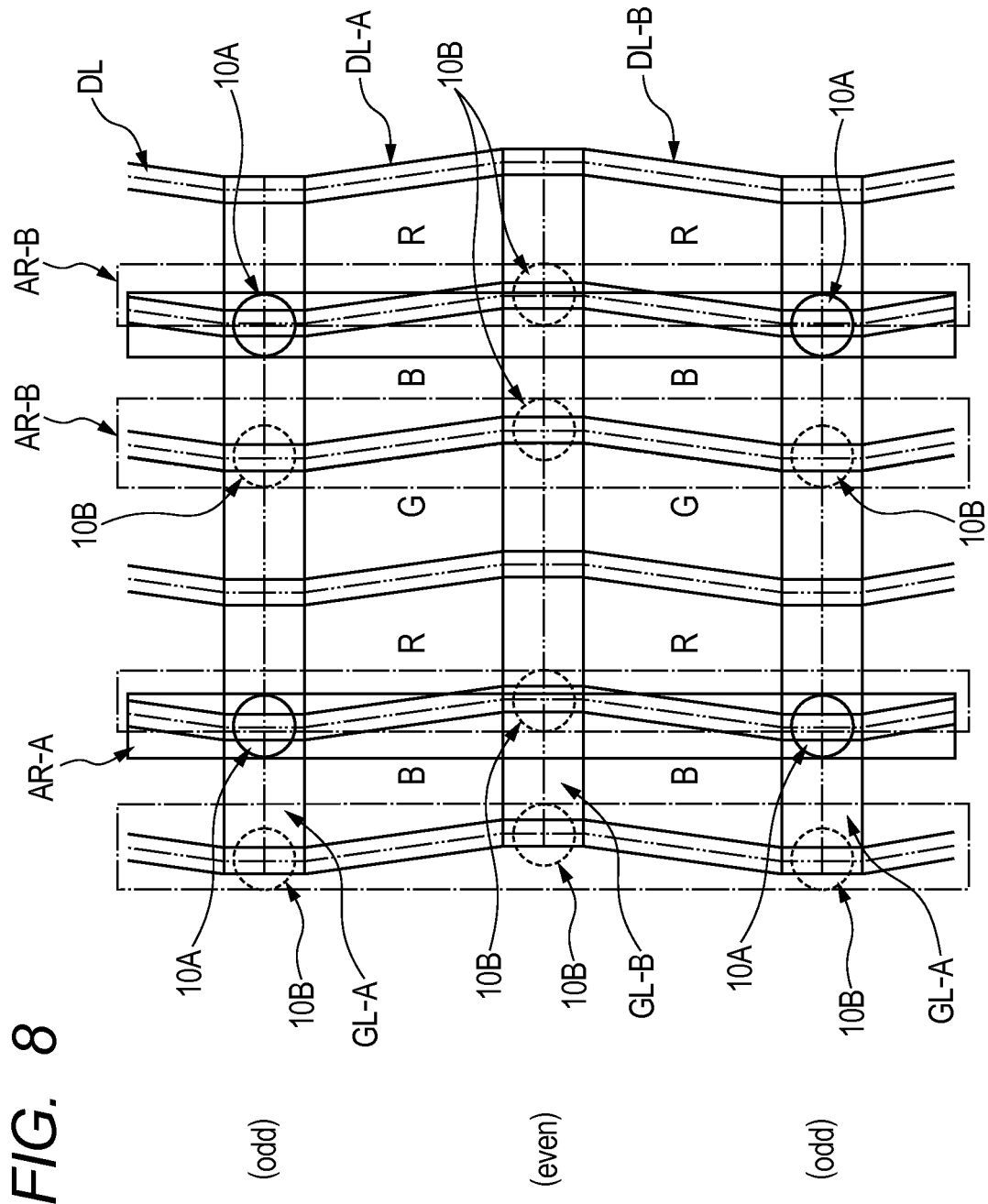
FIG. 8 is a top plan view explaining the disposition of columnar spacers of a liquid crystal display panel in a liquid crystal display device according to a fourth embodiment of the present invention.

FIG. 8 is a top plan view explaining the disposition of columnar spacers of a liquid crystal display panel in a liquid crystal display device according to a fourth embodiment of the present invention.

In general, one pixel is composed of the sub pixels of Red (R), Green (G), and Blue (B), and also in FIGS. 4 to 7, one columnar spacer is disposed per one pixel. However, in FIGS. 8 to 14, two columnar spacers are disposed per one pixel.

With the disposition shown in FIG. 8, the main columnar spacer 10A is disposed in the crossing point between the scanning line A(GL-A) and the video line DL provided between the sub pixel of Blue (B) and the sub pixel of Red (R).

In addition, the sub columnar spacer 10B is disposed in the crossing point between the scanning line B(GL-B), and the video line DL provided between the sub pixel of Blue (B) and the sub pixel of Red (R). Also, the sub columnar spacers 10B are disposed in the crossing points between all of the scanning lines (the scanning line A(GL-A) and the scanning line B(GL-B)), and the video line DL provided between the sub pixel of Green (G) and the sub pixel of Blue (B).

With the disposition shown in FIG. 4, none of the scratches AR-A, AR-B in the phase of the rubbing by both of the main columnar spacer 10A and the sub columnar spacer 10B is caused in the sub pixel of Green (G). However, with the disposition shown in FIG. 8, there is caused the scratch AR-B in the phase of the rubbing by the sub columnar spacer 10B having the low height. Except for this point, the disposition shown in FIG. 8 is identical to that shown in FIG. 4.

[Disposition of Columnar Spaces of Liquid Crystal Display Panel in Fifth Embodiment of the Present Invention]

Figure 9:
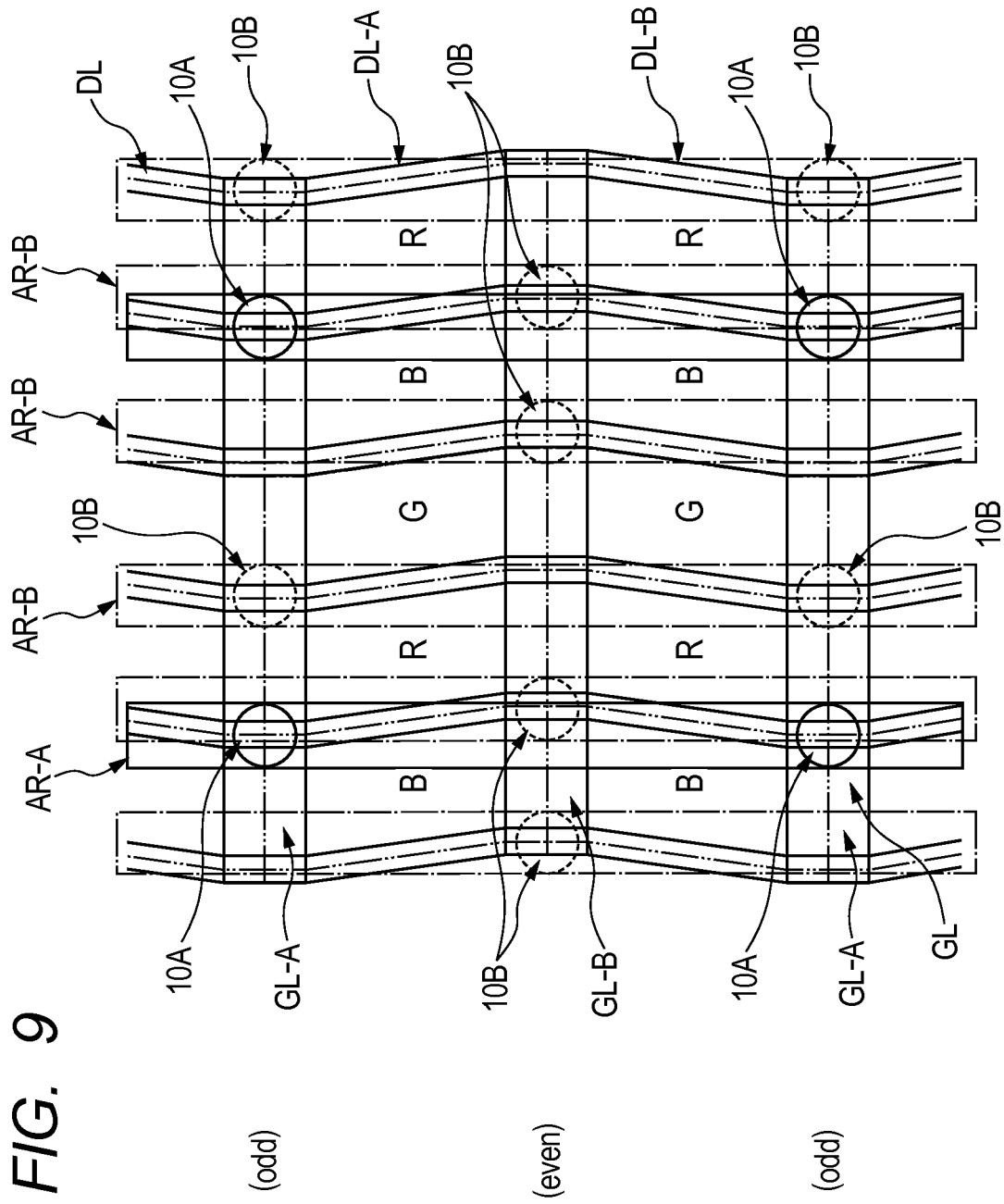
FIG. 9 is a top plan view explaining the disposition of columnar spacers of a liquid crystal display panel in a liquid crystal display device according to a fifth embodiment of the present invention.

FIG. 9 is a top plan view explaining the disposition of columnar spacers of a liquid crystal display panel in a liquid crystal display device according to a fifth embodiment of the present invention.

With the disposition shown in FIG. 9, the main columnar spacer 10A is disposed in the crossing point between the scanning line A(GL-A) and the video line DL provided between the sub pixel of Blue (B) and the sub pixel of Red (R).

In addition, the sub columnar spacer 10B is disposed in the crossing point between the scanning line B(GL-B) and the video line DL provided between the sub pixel of Blue (B) and the sub pixel of Red (R). Also, the sub columnar spacers 10B are respectively disposed in the crossing point between the scanning line A(GL-A) and the video line DL provided between the sub pixel of Red (R) and the sub pixel of Green (G), and in the crossing point between the scanning line B(GL-B) and the video line DL provided between the sub pixel of Green (G) and the sub pixel of Blue (B).

With the disposition shown in FIG. 9, the area in which the scratch AR-B in the phase of the rubbing by the sub columnar spacer 10B having the low height is caused becomes larger than that in the case of the disposition shown in FIG. 8. Except for this point, the disposition shown in FIG. 9 is identical to that shown in FIG. 8.

[Disposition of Columnar Spaces of Liquid Crystal Display Panel in Sixth Embodiment of the Present Invention]

Figure 10:
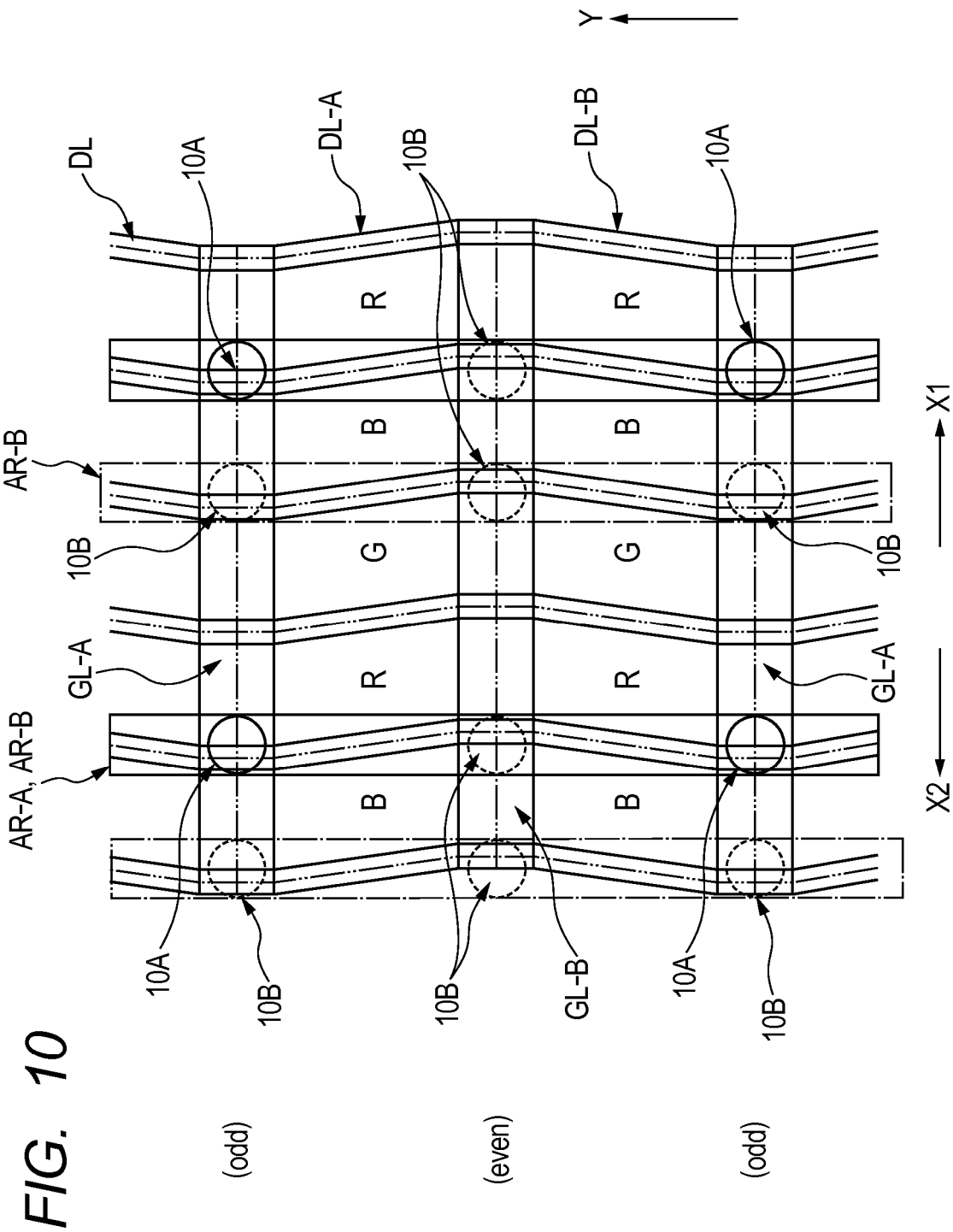
FIG. 10 is a top plan view explaining the disposition of columnar spacers of the liquid crystal display panel in the liquid crystal display device according to a sixth embodiment of the present invention.

FIG. 10 is a top plan view explaining the disposition of columnar spacers of a liquid crystal display panel in a liquid crystal display device according to a sixth embodiment of the present invention.

The disposition shown in FIG. 10 is such that in the disposition shown in FIG. 8, the main columnar spacer 10A and the sub columnar spacer 10B which are disposed above the scanning line A(GL-A) are both displaced in the direction of X1 shown in FIG. 10, and the sub columnar spacer 10B which is disposed above the scanning line B(GL-B) is disposed in the direction of X2 shown in FIG. 10. Also, the disposition shown in FIG. 10 is such that in the disposition shown in FIG. 8, the centers of the main columnar spacers 10A disposed in the Y direction of FIG. 10, and the centers of the sub columnar spacers 10B are made to agree with each other. That is to say, the center of the main columnar spacer 10A is disposed so as to be located in a position on the side of the sub pixel of Blue (B) (in the direction of X1) with respect to the crossing point between the scanning line A(GL-A) and the video line DL provided between the sub pixel of Blue (B) and the sub pixel of Red (R). The center of the sub columnar spacer 10B is disposed so as to be located in the position on the side of the sub pixel of Blue (B) (in the direction of X2) with respect to the crossing point between the scanning line B(GL-B) and the video line DL provided between the sub pixel of Blue (B) and the sub pixel of Red (R). The center of the sub columnar spacer 10B is disposed so as to be located in the position on the side of the sub pixel of Green (G) (in the direction of X2) with respect to the crossing point between the scanning line B(GL-B) and the video line DL provided between the sub pixel of Green (G) and the sub pixel of Blue (B). The center of the sub columnar spacer 10B is disposed so as to be located in the position on the side of the sub pixel of Blue (B) (in the direction of X1) with respect to the crossing point between the scanning line A(GL-A) and the video line DL provided between the sub pixel of Green (G) and the sub pixel of Blue (B).

With the disposition shown in FIG. 10, since the scratch AR-A and the scratch AR-B overlap each other, the area of the scratches can be reduced as compared with the case of the disposition shown in FIG. 8.

Note that, in FIG. 10, the centers of the main columnar spacers 10A disposed in the Y direction of FIG. 10 is made to agree with the centers of the sub columnar spacers 10B. However, the main columnar spacer 10A and the sub columnar spacer 10B which are disposed above the scanning line A(GL-A) are both displaced in the direction of X1 shown in FIG. 10 in an arbitrary position between a position corresponding to the state of FIG. 8 and a position corresponding to the state of FIG. 10. Also, the sub columnar spacer 10B disposed above the scanning line B(GL-B) is displaced in the direction of X2 shown in FIG. 10. As a result, since the scratch AR-A and the scratch AR-B overlap each other, the area of the scratches can be reduced as compared with the case of the disposition shown in FIG. 8. That is to say, the centers of the main columnar spacers 10A disposed in the Y direction of FIG. 10, and the centers of the sub columnar spacers 10B are not necessarily made to agree with each other, and thus they may be slightly shifted from each other as long as the amount of position shift in this case is smaller than that in FIG. 8.

In addition, in FIGS. 8 and 10, the main columnar spacer 10A is disposed in the crossing point (or in the vicinity thereof) between the scanning line A(GL-A) and the video line DL provided between the sub pixel of Blue (B) and the sub pixel of Red (R). Also, the sub columnar spacer 10B is disposed in the crossing point (or in the vicinity thereof) between the scanning line B(GL-B) and the video line DL provided between the sub pixel of Blue (B) and the sub pixel of Red (R). Also, the sub columnar spacer 10B is disposed in the crossing points (or in the vicinities thereof) between all of the scanning lines (the scanning line A(GL-A) and the scanning line B(GL-B)), and the video line DL provided between the sub pixel of Green (G) and the sub pixel of Blue (B). However, alternatively, the main columnar spacer 10A may be disposed in the crossing point (or in the vicinity thereof) between the scanning line B(GL-B) and the video line DL provided between the sub pixel of Blue (B) and the sub pixel of Red (R). Also, the sub columnar spacer 10B may be disposed in the crossing point (or in the vicinity thereof) between the scanning line A(GL-A) and the video line DL provided between the sub pixel of Blue (B) and the sub pixel of Red (R). Also, the sub columnar spacer 10B may be disposed in the crossing point (or in the vicinity thereof) between all of the scanning lines (the scanning line A(GL-A) and the scanning line B(GL-B)) and the video line DL provided between the sub pixel of Green (G) and the sub pixel of Blue (B).

In addition, in FIGS. 8 and 10, the disposition of the sub pixels within one pixel may be changed to the disposition of the sub pixels of Blue (B), Green (G), and Red (R) instead of using the disposition of the sub pixels of Red (R), Green (G), and Blue (B).

[Disposition of Columnar Spacers of Liquid Crystal Display Panel in Seventh Embodiment of the Present Invention]

Figure 11:
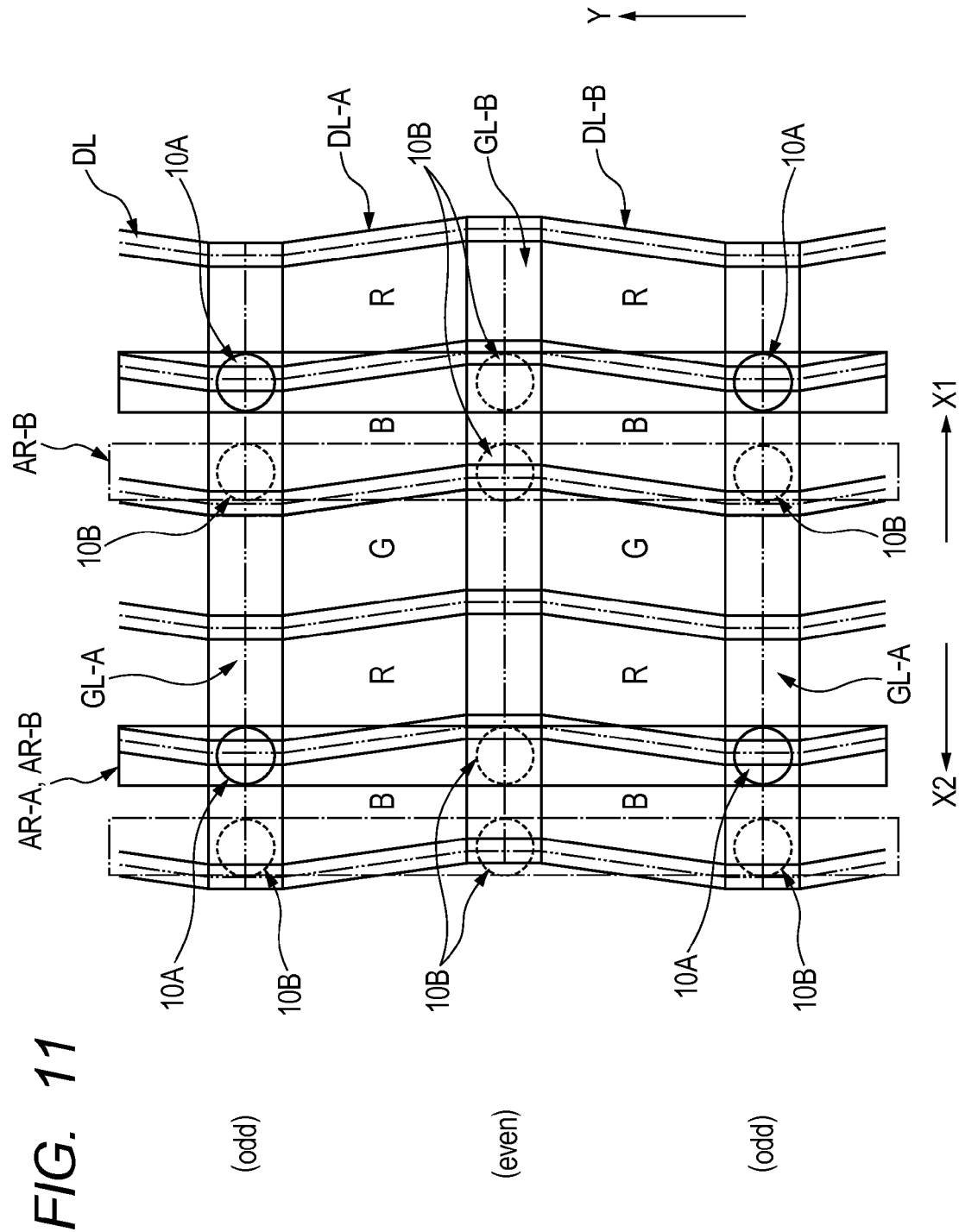
FIG. 11 is a top plan view explaining the disposition of columnar spacers of a liquid crystal display panel in a liquid crystal display device according to a seventh embodiment of the present invention.

FIG. 11 is a top plan view explaining the disposition of columnar spacers of a liquid crystal display panel in a liquid crystal display device according to a seventh embodiment of the present invention.

The disposition shown in FIG. 11 is such that in the disposition shown in FIG. 8, the sub columnar spacer 10B which is disposed in the crossing point between the scanning line B(GL-B) and the video line DL provided between the sub pixel of Blue (B) and the sub pixel of Red (R) is displaced in the direction of X2 shown in FIG. 11. Also, the disposition shown in FIG. 11 is such that in the disposition shown in FIG. 8, the sub columnar spacer 10B which is disposed in the crossing point between the scanning line A(GL-A) and the video line DL provided between the sub pixel of Green (G) and the sub pixel of Blue (B) is displaced in the direction of X1 shown in FIG. 11. Also, the disposition shown in FIG. 11 is such that in the disposition shown in FIG. 8, the centers of the main columnar spacers 10A disposed in the Y direction of FIG. 11, and the centers of the sub columnar spacers 10B disposed in the Y direction of FIG. 11 are made to agree with each other. That is to say, the center of the sub columnar spacer 10B is disposed so as to be located in a position on the side of the sub pixel of Blue (B) (in the direction of X1) with respect to the crossing point between the scanning line A(GL-A) and the video line DL provided between the sub pixel of Green (G) and the sub pixel of Blue (B). The center of the sub columnar spacer 10B is disposed so as to be located in the position on the side of the sub pixel of Blue (B) (in the direction of X2) with respect to the crossing point between the scanning line B(GL-B) and the video line DL provided between the sub pixel of Blue (B) and the sub pixel of Red (R). It is noted that the centers of the main columnar spacers 10A disposed in the Y direction of FIG. 11, and the centers of the sub columnar spacers 10B disposed in the Y direction of FIG. 11 are not necessarily made to agree with each other, and thus they may be slightly shifted from each other as long as the amount of position shift in this case is smaller than that in FIG. 8.

Figure 12:
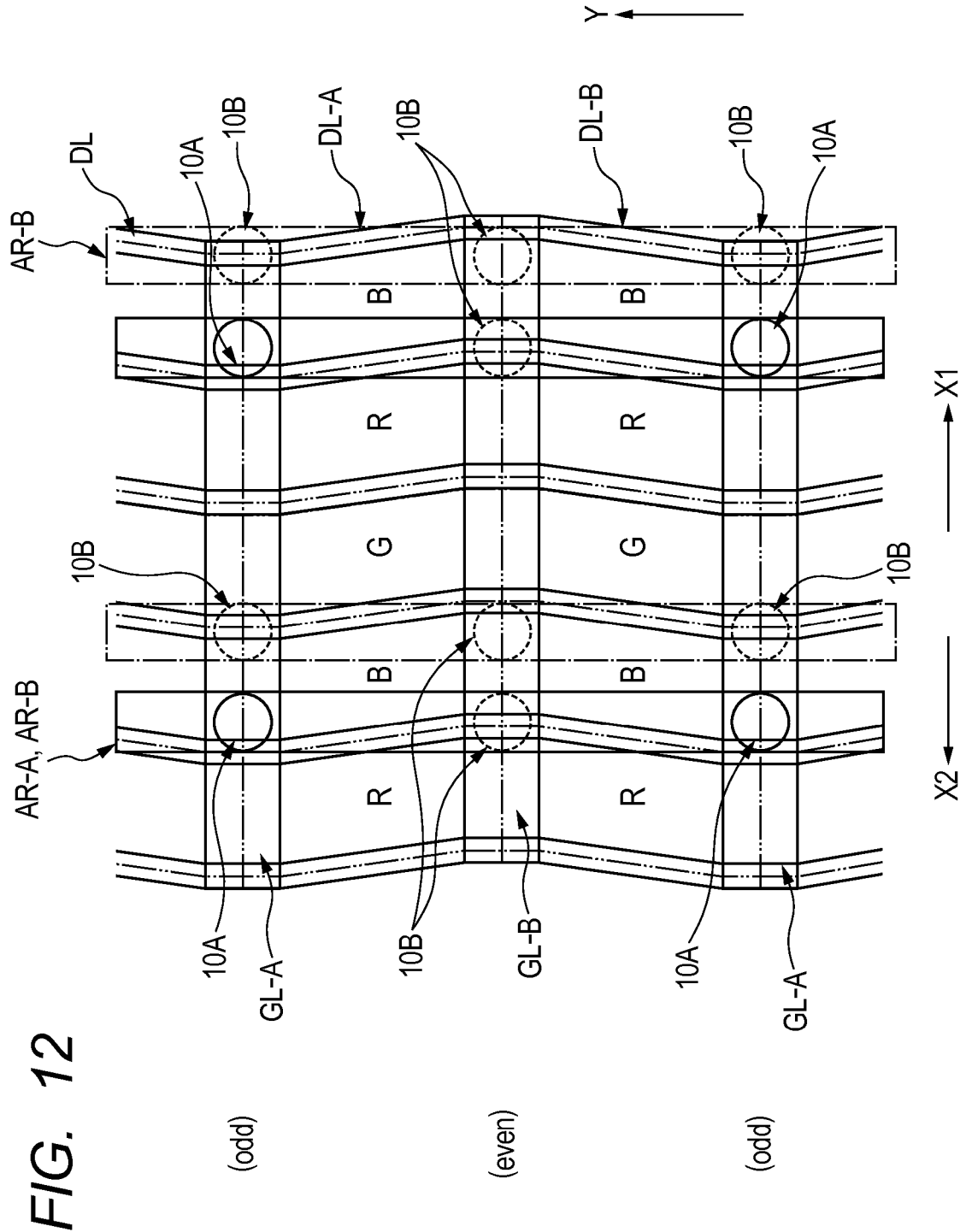
FIG. 12 is a top plan view explaining the disposition of columnar spacers of a liquid crystal display panel in a liquid crystal display device according to a modified change of the seventh embodiment of the present invention.

FIG. 12 is a top plan view explaining the disposition of columnar spacers of a liquid crystal display panel in a liquid crystal display device according to a modified change of the seventh embodiment of the present invention.

The disposition shown in FIG. 12 is such that the disposition of the sub pixels within one pixel is changed to the disposition of Blue (B), Green (G), and Red (R) instead of using the disposition of the sub pixels of Red (R), Green (G), and Blue (B). Thus, in the case of the disposition of FIG. 12, the main columnar spacer 10A which is disposed in the crossing point between the scanning line A(GL-A) and the video line DL provided between the sub pixel of Red (R) and the sub pixel of Blue (B) is displaced in the direction of X1 shown in FIG. 12. Also, the sub columnar spacer 10B which is disposed in the crossing point between the scanning line B(GL-B) and the video line DL provided between the sub pixel of Blue (B) and the sub pixel of Green (G) is displaced in the direction of X2 shown in FIG. 12. Also, the centers of the main columnar spacers 10A disposed in the Y direction of FIG. 12, and the centers of the sub columnar spacers 10B disposed in the Y direction of FIG. 12 are made to agree with each other. That is to say, the center of the main columnar spacer 10A is disposed so as to be located in the position on the side of the sub pixel of Blue (B) (in the direction of X1) with respect to the crossing point between the scanning line A(GL-A) and the video line DL provided between the sub pixel of Red (R) and the sub pixel of Blue (B). The center of the sub columnar spacer 10B is disposed so as to be located in the position on the side of the sub pixel of Blue (B) (in the direction of X2) with respect to the crossing point between the scanning line B(GL-B) and the video line DL provided between the sub pixel of Blue (B) and the sub pixel of Red (R). It is noted that the centers of the main columnar spacers 10A disposed in the Y direction of FIG. 12, and the centers of the sub columnar spacers 10B disposed in the Y direction of FIG. 12 are not necessarily made to agree with each other, and thus they may be slightly shifted from each other as long as the amount of position shift in this case is smaller than that in FIG. 8.

With the disposition shown in FIG. 12, similarly to the case of the disposition shown in FIG. 10, the scratch AR-A and the scratch AR-B overlap each other, thereby making it possible to reduce the area of the scratches.

It is noted that displacement amounts of main columnar spacer 10A and sub columnar spacer 10B are each increased, whereby it is possible to remove the scratches AR-A, AR-B, in the phase of the rubbing by both of the main columnar spacer 10A having the high height and the sub columnar spacer 10B having the low height, which are caused in the sub pixel of Green (G) or the sub pixel of Red (R). However, if the displacement amount is made large, then, the top of the main columnar spacer 10A or the sub columnar spacer 10B does not come in contact with the stepped portion (the stepped portion caused by the crossing between the scanning line GL and the video line DL). For this reason, the displacement amount is preferably set in such a way that the top of the main columnar spacer 10A or the sub columnar spacer 10B comes in contact with a part of the stepped portion.

[Disposition of Columnar Spacers of Liquid Crystal Display Panel in Eighth Embodiment of the Present Invention]

Figure 13:
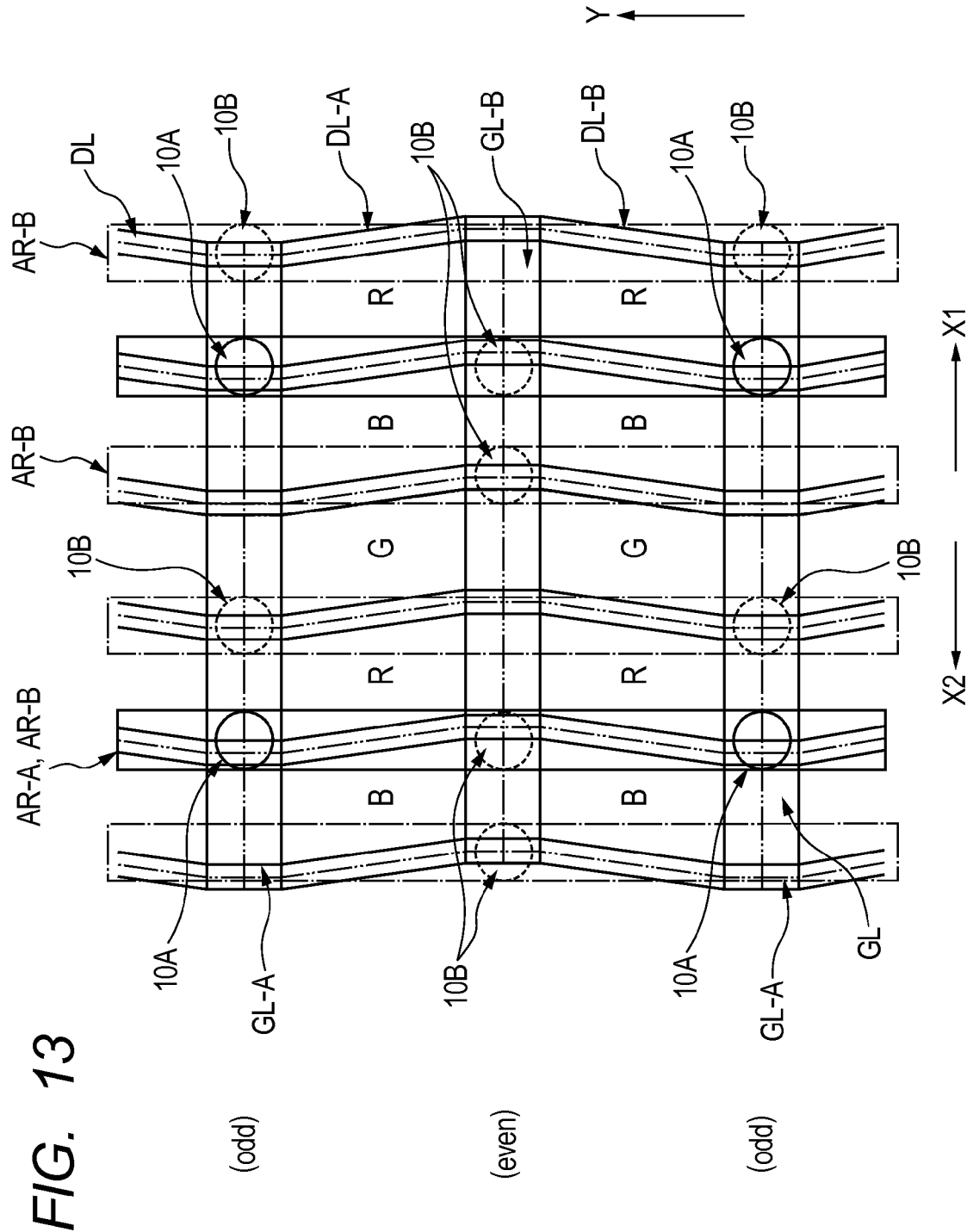
FIG. 13 is a top plan view explaining the disposition of columnar spacers of a liquid crystal display panel in a liquid crystal display device according to an eighth embodiment of the present invention.

FIG. 13 is a top plan view explaining the disposition of columnar spacers of a liquid crystal display panel in a liquid crystal display device according to an eighth embodiment of the present invention.

The disposition shown in FIG. 13 is such that in the disposition shown in FIG. 9, the main columnar spacer 10A which is disposed in the crossing point between the scanning line A(GL-A) and the video line DL provided between the sub pixel of Blue (B) and the sub pixel of Red (R) is displaced in the direction of X1 shown in FIG. 13. Also, the disposition shown in FIG. 13 is such that in the disposition shown in FIG. 9, the sub columnar spacer 10B which is disposed in the crossing point between the scanning line B(GL-B) and the video line DL provided between the sub pixel of Blue (B) and the sub pixel of Red (R) is displaced in the direction of X2 shown in FIG. 13. Also, the centers of the main columnar spacers 10A disposed in the Y direction of FIG. 13, and the centers of the sub columnar spacers 10B are made to agree with each other. That is to say, the center of the main columnar spacer 10A is disposed so as to be located in the position on the side of the sub pixel of Red (R) (in the direction of X1) with respect to the crossing point between the scanning line A(GL-A) and the video line DL provided between the sub pixel of Blue (B) and the sub pixel of Red (R). The center of the sub columnar spacer 10B is disposed so as to be located in the position on the side of the sub pixel of Blue (B) (in the direction of X2) with respect to the crossing point between the scanning line B(GL-B) and the video line DL provided between the sub pixel of Blue (B) and the sub pixel of Red (R).

With the disposition shown in FIG. 13, since the scratch AR-A and the scratch AR-B overlap each other, the area of the scratches can be reduced as compared with the case of the disposition shown in FIG. 9.

Note that, in FIG. 13, the centers of the main columnar spacers 10A disposed in the Y direction of FIG. 13, and the centers of the sub columnar spacers 10B are made to agree with each other. However, the main columnar spacer 10A which is disposed in the crossing point between the scanning line A(GL-A) and the video line DL provided between the sub pixel of Blue (B) and the sub pixel of Red (R) is displaced in the direction of X1 shown in FIG. 13 in an arbitrary position between the position corresponding to the state of FIG. 9 and the position corresponding to the state of FIG. 13. Also, the sub columnar spacer 10B which is disposed between the scanning line B(GL-B) and the video line DL provided between the sub pixel of Blue (B) and the sub pixel of Red (R) is displaced in the direction of X2 shown in FIG. 13. As a result, since the scratch AR-A and the scratch AR-B overlap each other, the area of the scratches can be reduced as compared with the case of the disposition shown in FIG. 9. That is to say, the centers of the main columnar spacers 10A disposed in the Y direction of FIG. 13, and the centers of the sub columnar spacers 10B are not necessarily made to agree with each other, and thus they may be slightly shifted from each other as long as the amount of position shift in this case is smaller than that in FIG. 9.

In addition, in FIGS. 9 and 13, the main columnar spacer 10A is disposed in the crossing point (or in the vicinity thereof) between the scanning line A(GL-A) and the video line DL provided between the sub pixel of Blue (B) and the sub pixel of Red (R). Also, the sub columnar spacer 10B is disposed in the crossing point between the scanning line A(GL-A) and the video line DL provided between the sub pixel of Red (R) and the sub pixel of Green (G), in the crossing point (or in the vicinity thereof) between the scanning line B(GL-B) and the video line DL provided between the sub pixel of Blue (B) and the sub pixel of Red (R), and in the crossing point between the scanning line B(GL-B) and the video line DL provided between the sub pixel of Green (G) and the sub pixel of Blue (B). However, the main columnar spacer 10A may be disposed in the crossing point (or in the vicinity thereof) between the scanning line B(GL-B) and the video line DL provided between the sub pixel of Blue (B) and the sub pixel of Red (R). The sub columnar spacer 10B may be disposed in the crossing point between the scanning line B(GL-B) and the video line DL provided between the sub pixel of Red (R) and the sub pixel of Green (G), in the crossing point (or in the vicinity thereof) between the scanning line A(GL-A) and the video line DL provided between the sub pixel of Blue (B) and the sub pixel of Red (R), and in the crossing point between the scanning line A(GL-A) and the video line DL provided between the sub pixel of Green (G) and the sub pixel of Blue (B).

In addition, in FIGS. 9 and 13, the disposition of the sub pixels within one pixel may be changed to the disposition of the sub pixels of Blue (B), Green (G), and Red (R) instead of using the disposition of the sub pixels of Red (R), Green (G), and Blue (B).

[Disposition of Columnar Spacers of Liquid Crystal Display Panel in Ninth Embodiment of the Present Invention]

Figure 14:
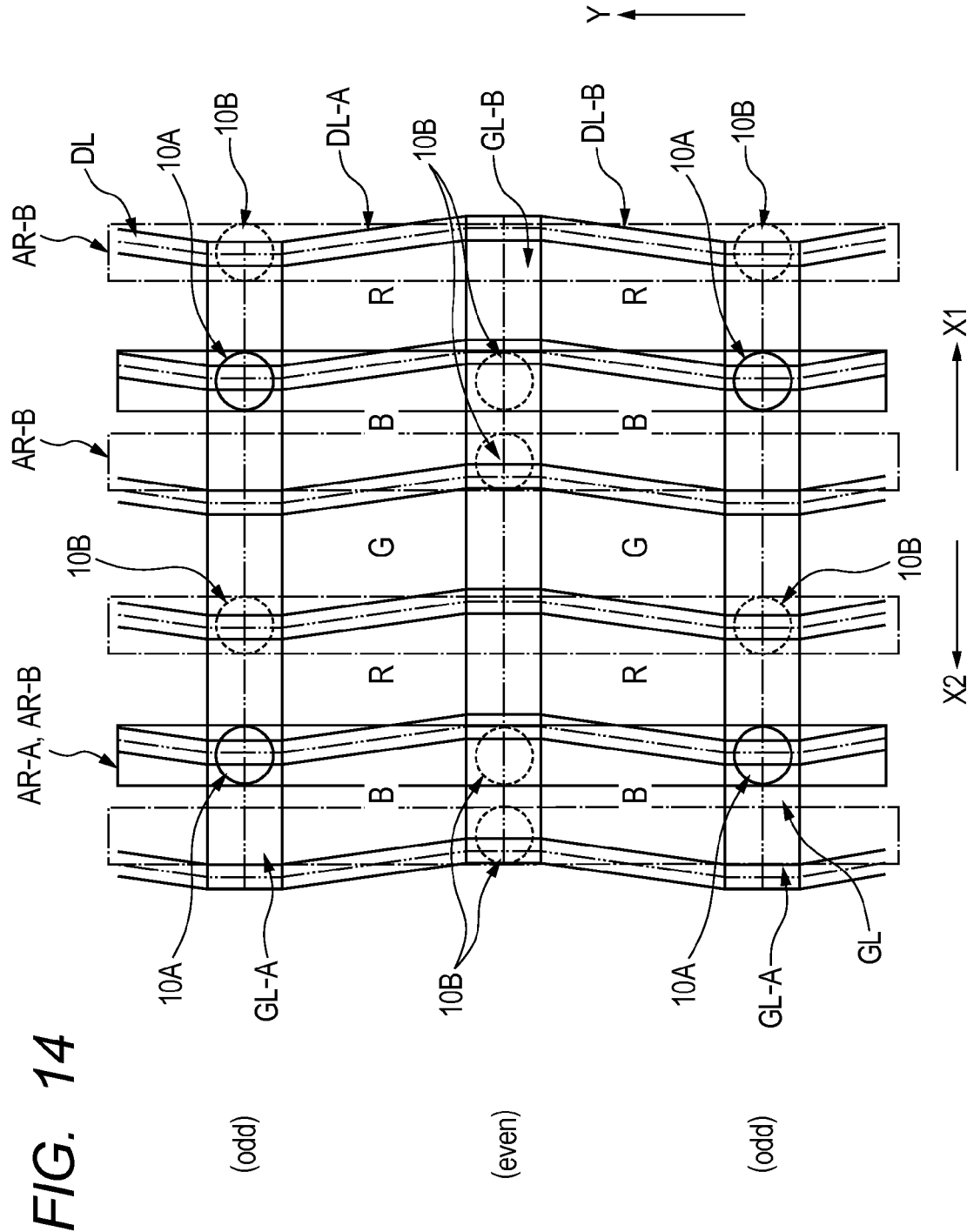
FIG. 14 is a top plan view explaining the disposition of columnar spacers of a liquid crystal display panel in a liquid crystal display device according to a ninth embodiment of the present invention.

FIG. 14 is a top plan view explaining the disposition of columnar spacers of a liquid crystal display panel in a liquid crystal display device according to a ninth embodiment of the present invention.

The disposition shown in FIG. 14 is such that in the disposition shown in FIG. 9, the sub columnar spacer 10B which is disposed in the crossing point between the scanning line B(GL-B) and the video line DL provided between the sub pixel of Blue (B) and the sub pixel of Red (R) is displaced in the direction of X2 shown in FIG. 14. Also, the disposition shown in FIG. 14 is such that in the disposition shown in FIG. 9, the sub columnar spacer 10B which is disposed in the crossing point between the scanning line B(GL-B) and the video line DL provided between the sub pixel of Green (G) and the sub pixel of Blue (B) is displaced in the direction of X1 shown in FIG. 14. Also, the centers of the main columnar spacers 10A disposed in the Y direction of FIG. 13, and the centers of the sub columnar spacers 10B are made to agree with each other. That is to say, the center of the sub columnar spacer 10B is disposed so as to be located in the position on the side of the sub pixel of Blue (B) (in the direction of X2) with respect to the crossing point between the scanning line B(GL-B) and the video line DL provided between the sub pixel of Blue (B) and the sub pixel of Red (R). The center of the sub columnar spacer 10B is disposed so as to be located in the position on the side of the sub pixel of Blue (B) (in the direction of X1) with respect to the crossing point between the scanning line B(GL-B) and the video line DL provided between the sub pixel of Green (G) and the sub pixel of Blue (B). It is noted that the centers of the main columnar spacers 10A disposed in the Y direction of FIG. 14, and the centers of the sub columnar spacers 10B are not necessarily made to agree with each other, and thus they may be slightly shifted from each other as long as the amount of position shift in this case is smaller than that in FIG. 9.

With the disposition shown in FIG. 14, similarly to the area of the disposition shown in FIG. 13, since the scratch AR-A and the scratch AR-B overlap each other, it is possible to reduce the area of the scratches.

It is noted that even when the disposition of the sub pixels within one pixel is the disposition of the sub pixels of Blue (B), Green (G), and Red (R), the main columnar spacer 10A and the sub columnar spacer 10B which are respectively disposed in the crossing points between the scanning line A(GL-A) or B(GL-B), and the video line DL provided between the sub pixel of Blue (B), and the sub pixel of Green (G) or Red (R) adjacent thereto are displaced on the side of the sub pixel of Blue (B), whereby it is possible to obtain the same operation and effects as those in the disposition shown in FIG. 14.

In addition, the displacement amounts of main columnar spacer 10A and the sub columnar spacer 10B are each increased, whereby it is possible to remove the scratches AR-A, AR-B, in the phase of the rubbing by both of the main columnar spacer 10A having the high height and the sub columnar spacer 10B having the low height, which are caused in the sub pixel of Red (R). However, if the displacement amount is made large, then, the top of the main columnar spacer 10A or the sub columnar spacer 10B does not come in contact with the stepped portion (the stepped portion caused by the crossing between the scanning line GL and the video line DL). For this reason, the displacement amount is preferably set in such a way that the top of the main columnar spacer 10A or the sub columnar spacer 10B comes in contact with a part of the stepped portion.

Note that, in the above description, in FIGS. 4 to 14, the scanning line A(GL-A) is set as the odd-numbered (odd) scanning line, and the scanning line B(GL-B) is set as the even-numbered (even) scanning line. However, the scanning line A(GL-A) may be set as the even-numbered (even) scanning line, whereas the scanning line B(GL-B) may be set as the odd-numbered (odd) scanning line.

In addition, although in the above description, the description has been given with respect to the embodiments in each of which the present invention is applied to the liquid crystal display device using the IPS system, the present invention is by no means limited thereto. Thus, for example, the present invention can also be applied to a liquid crystal display device using a Twisted Nematic (TN) system, an Electrically Controlled Birefringence (ECB) system, or a Vertically Aligned (VA) system. However, when the present invention is applied to any of those liquid crystal display devices, the counter electrode CT is formed on the side of the CF substrate SUB2.

Note that, the embodiments of the present invention have also been described on the assumption that the top portion of the columnar spacer comes in contact with the convex portion formed based on the stepped portion in the crossing portion between the signal lines formed on the TFT substrate. For example, however, as shown in FIG. 2, the mounting portion may also be provided above the TFT substrate.

Although the invention made by the inventor of this application has been concretely described based on the embodiments described above so far, the present invention is by no means limited by the embodiments described above, and it is therefore to be understood that the various changes can be made without departing from the subject matter thereof.

The invention may be embodied in other specific forms without departing from the spirit or essential characteristics thereof. The present embodiment is therefore to be considered in all respects as illustrative and not restrictive, the scope of the invention being indicated by the appended claims, rather than by the foregoing description, and all changes which come within the meaning and range of equivalency of the claims are therefore intended to be embraced therein.

What is claimed is:

1. A liquid crystal display device having plural pixels, comprising:
    a first substrate; and
    a second substrate,
    wherein said first substrate has:
        plural scanning lines disposed in a second direction so as to extend in a first direction perpendicular to the second direction; and
        plural video lines disposed in the first direction so as to extend in the second direction while they are bent,
    each of said video lines has:
        a first portion in which an acute-angled crossing angle of two crossing angles crossing each of said scanning lines becomes a positive angle in a clockwise direction from each of said scanning lines; and
        a second portion in which the acute-angled crossing angle of the two crossing angles crossing each of said scanning lines becomes a negative angle in a clockwise direction from each of said scanning lines,
    said first portion and said second portion are alternately disposed so as to have a scanning line of the plural scanning lines between them,
    said second substrate has columnar spacers which are respectively disposed in crossing portions where said plural scanning lines cross said video lines,
    each of said pixels is composed of a pixel of a first color, a pixel of a second color, and a sub pixel of a third color which are disposed in order along the first direction,
    said sub pixel of the second color is a sub pixel of a green color,
    each of said columnar spacers has a main columnar spacer and a sub columnar spacer,
    a scanning line A is one of an odd-numbered scanning line or an even-numbered scanning line, and a scanning line B is the other of the odd-numbered scanning line or the even-numbered scanning line,
    said main columnar spacer is disposed in a crossing position where said scanning line A crosses a video line of the plural video lines between said sub pixel of the third color and said sub pixel of the first color which are adjacent to each other,
    said sub columnar spacer is disposed in a crossing position where said scanning line B crosses the video line of the plural video lines between said sub pixel of the third color and said sub pixel of the first color which are adjacent to each other, and
    a height of said main columnar spacer is set higher than that of said sub columnar spacer.

2. The liquid crystal display device according to claim 1, wherein said main columnar spacer is disposed in a crossing point between said scanning line A and the video line of the plural video lines between said sub pixel of the third color and said sub pixel of the first color which are adjacent to each other, and said sub columnar spacer is disposed in a crossing point between said scanning line B and the video line of the plural video lines between said sub pixel of the third color and said sub pixel of the first color which are adjacent to each other.

3. The liquid crystal display device according to claim 1, wherein said main columnar spacer is disposed in a crossing point between said scanning line A and the video line of the plural video lines between said sub pixel of the third color and said sub pixel of the first color which are adjacent to each other, and said sub columnar spacer is disposed in a crossing point between said scanning line B and the video line of the plural video lines between said sub pixel of the third color and said sub pixel of the first color which are adjacent to each other, and in crossing points between all of said scanning lines and a video line of the plural video lines between said sub pixel of the second color and said sub pixel of the third color which are adjacent to each other.

4. The liquid crystal display device according to claim 1, wherein said main columnar spacer is disposed in a crossing point between said scanning line A and the video line of the plural video lines between said sub pixel of the third color and said sub pixel of the first color which are adjacent to each other, and said sub columnar spacer is disposed in a crossing point between said scanning line B and the video line of the plural video lines between said sub pixel of the third color and said sub pixel of the first color which are adjacent to each other, in a crossing point between said scanning line A and a video line of the plural video lines between said sub pixel of the first color and said sub pixel of the second color which are adjacent to each other, and in a crossing point between said scanning line B and a video line of the plural video lines between said sub pixel of the second color and said sub pixel of the third color which are adjacent to each other.

5. The liquid crystal display device according to claim 1, wherein said sub pixel of the first color is a sub pixel of a red color, and said sub pixel of the third color is a sub pixel of a blue color.

6. The liquid crystal display device according to claim 1, wherein the second direction is a rubbing travelling direction.

7. A liquid crystal display device having plural pixels, comprising:
a first substrate; and
a second substrate,
wherein said first substrate has:
plural scanning lines disposed in a second direction so as to extend in a first direction perpendicular to the second direction; and
plural video lines disposed in the first direction so as to extend in the second direction while they are bent,
each of said video lines has:
a first portion in which an acute-angled crossing angle of two crossing angles crossing each of said scanning lines becomes a positive angle in a clockwise direction from each of said scanning lines; and
a second portion in which the acute-angled crossing angle of the two crossing angles crossing each of said scanning lines becomes a negative angle in a clockwise direction from each of said scanning lines,
said first portion and said second portion are alternately disposed so as to have a scanning line of the plural scanning lines between them, said second substrate has columnar spacers which are respectively disposed in crossing portions where said plural scanning lines cross said video lines, each of said pixels is composed of a sub pixel of a first color, a sub pixel of a second color, and a sub pixel of a third color which are disposed in order along the first direction, said sub pixel of the second color is a sub pixel of a green color, said columnar spacer has a first columnar spacer and a second columnar spacer, a scanning line A is the scanning line of the plural scanning lines between the first portion and the second portion, and a scanning line B is another scanning line of the plural scanning lines on a side of said first portion or said second portion opposite said scanning line A, said first columnar spacer is disposed in a crossing position where said scanning line A crosses a video line of the plural video lines between said sub pixel of the third color and said sub pixel of the first color which are adjacent to each other, and said second columnar spacer is disposed in said crossing position where said scanning line B crosses the video line of the plural video lines between said sub pixel of the third color and said sub pixel of the first color which are adjacent to each other, and said first columnar spacer is a main columnar spacer, said second columnar spacer is a sub columnar spacer, and a height of said first columnar spacer is set higher than that of said second columnar spacer.

8. The liquid crystal display device according to claim 7, wherein said first columnar spacer is disposed in such a way that a center of said first columnar spacer is located in a position on a side of said sub pixel of the first color with respect to a crossing point between said scanning line A and the video line of the plural video lines between said sub pixel of the third color and said sub pixel of the first color which are adjacent to each other, and said second columnar spacer is disposed in such a way that a center of said second columnar spacer is located in a position on a side of said sub pixel of the third color with respect to a crossing point between said scanning line B and the video line of the plural video lines between said sub pixel of the third color and said sub pixel of the first color which are adjacent to each other.

9. The liquid crystal display device according to claim 7, wherein said second columnar spacer is disposed in such a way that a center of said second columnar spacer is located in a position on a side of said sub pixel of the third color with respect to a crossing point between said scanning line B and the video line of the plural video lines between said sub pixel of the third color and said sub pixel of the first color which are adjacent to each other.

10. The liquid crystal display device according to claim 7, wherein said first columnar spacer is disposed in such a way that a center of said first columnar spacer is located in a position on a side of said sub pixel of the first color with respect to a crossing point between said scanning line A and the video line of the plural video lines between said sub pixel of the third color and said sub pixel of the first color which are adjacent to each other.

11. The liquid crystal display device according to claim 7, wherein said second columnar spacer is disposed in crossing positions where all of said scanning lines and a video line of the plural video lines between said sub pixel of the second color and said sub pixel of the third color which are adjacent to each other cross each other, said first columnar spacer is disposed in such a way that a center of said first columnar spacer is located in a position on a side of said sub pixel of the first color with respect to a crossing point between said scanning line A and the video line of the plural video lines between said sub pixel of the third color and said sub pixel of the first color which are adjacent to each other, and said second columnar spacer is disposed in such a way that a center of said second columnar spacer is located in a position on a side of said sub pixel of the third color with respect to a crossing point between said scanning line B and the video line of the plural video lines between said sub pixel of the third color and said sub pixel of the first color which are adjacent to each other, in a position on a side of said sub pixel of the second color with respect to a crossing point between said scanning line B and the video line of the plural video lines between said sub pixel of the second color and said sub pixel of the third color which are adjacent to each other, and in a position on a side of said sub pixel of the third color with respect to a crossing point between said scanning line A and the video line of the plural video lines between said sub pixel of the second color and said sub pixel of the third color which are adjacent to each other.

12. The liquid crystal display device according to claim 7, wherein said second columnar spacer is disposed in crossing positions where all of said scanning lines cross a video line of the plural video lines between said sub pixel of the second color and said sub pixel of the third color which are adjacent to each other, and said second columnar spacer is disposed in such a way that a center of said second columnar spacer is located in a position on a side of said sub pixel of the third color with respect to a crossing point between said scanning line A and the video line of the plural video lines between said sub pixel of the second color and said sub pixel of the third color which are adjacent to each other, and in a position on a side of said sub pixel of the third color with respect to a crossing point between said scanning line B and the video line of the plural video lines between said sub pixel of the third color and said sub pixel of the first color which are adjacent to each other.

13. The liquid crystal display device according to claim 7, wherein said second columnar spacer is disposed in crossing positions where all of said scanning lines cross a video line of the plural video lines between said sub pixel of the first color and said sub pixel of the second color which are adjacent to each other, said first columnar spacer is disposed in such a way that a center of said first columnar spacer is located in a position on a side of said sub pixel of the first color with respect to a crossing point between said scanning line A and the video line of the plural video lines between said sub pixel of the third color and said sub pixel of the first color which are adjacent to each other, and said second columnar spacer is disposed in such a way that a center of said second columnar spacer is located in a position on a side of said sub pixel of the first color with respect to a crossing point between said scanning line B and the video line of the plural video lines between said sub pixel of the first color and said sub pixel of the second color which are adjacent to each other.

14. The liquid crystal display device according to claim 7, wherein said second columnar spacer is disposed in a crossing position between said scanning line A and a video line of the plural video lines between said sub pixel of the first color and said sub pixel of the second color which are adjacent to each other, and in a crossing position between said scanning line B and a video line of the plural video lines between said sub pixel of the second color and said sub pixel of the third color which are adjacent to each other, said first columnar spacer is disposed in such a way that a center of said first columnar spacer is located in a position on a side of said sub pixel of the first color with respect to a crossing point between said scanning line A and the video line of the plural video lines between said sub pixel of the third color and said sub pixel of the first color which are adjacent to each other, and said second columnar spacer is disposed in such a way that a center of said second columnar spacer is located in a position on a side of said sub pixel of the third color with respect to a crossing point between said scanning line B and the video line of the plural video lines between said sub pixel of the third color and said sub pixel of the first color which are adjacent to each other.

15. The liquid crystal display device according to claim 7, wherein said second columnar spacer is disposed in a crossing position between said scanning line B and a video line of the plural video lines between said sub pixel of the first color and said sub pixel of the second color which are adjacent to each other, and in a crossing position between said scanning line A and a video line of the plural video lines between said sub pixel of the second color and said sub pixel of the third color which are adjacent to each other, said second columnar spacer is disposed in a crossing position between said scanning line A and the video line of the plural video lines between said sub pixel of the first color and said sub pixel of the second color which are adjacent to each other, and in a crossing position between said scanning line B and the video line of the plural video lines between said sub pixel of the second color and said sub pixel of the third color which are adjacent to each other, and said second columnar spacer is disposed in such a way that a center of said second columnar spacer is located in a position on a side of said sub pixel of the third color with respect to a crossing point between said scanning line B and the video line of the plural video lines between said sub pixel of the third color and said sub pixel of the first color which are adjacent to each other, and said second columnar spacer is disposed in a crossing point between said scanning line B and the video line of the plural video lines between said sub pixel of the second color and said sub pixel of the third color, and in a crossing point between said scanning line A and the video line of the plural video lines between said sub pixel of the second color and said sub pixel of the third color which are adjacent to each other.

16. The liquid crystal display device according to claim 7, wherein said first columnar spacer and said second columnar spacer which are disposed in the second direction are disposed in such a way that centers of said first columnar spacer and said second columnar spacer are located on the same straight line.

17. The liquid crystal display device according to claim 7, wherein said sub pixel of the first color is a sub pixel of a red color, and said sub pixel of the third color is a sub pixel of a blue color.

18. The liquid crystal display device according to claim 7, wherein the second direction is a rubbing travelling direction.

* * * * *